US008292791B2

(12) United States Patent
Akama et al.

(10) Patent No.: US 8,292,791 B2

(45) Date of Patent: Oct. 23, 2012

(54) ELECTRICAL CONDUCTIVE ROLLER

(75) Inventors: Shuyou Akama, Saitama (JP); Hiroyuki Anzai, Mitaka (JP); Koji Takagi, Kawasaki (JP)

(73) Assignee: Bridgestone Corporation, Tokyo (JP)

( * ) Notice: Subject to any disclaimer, the term of this patent is extended or adjusted under 35 U.S.C. 154(b) by 1313 days.

(21) Appl. No.: 11/910,662

(22) PCT Filed: Mar. 28, 2006

(86) PCT No.: PCT/JP2006/306281

§ 371 (c)(1),
(2), (4) Date: Dec. 26, 2007

(87) PCT Pub. No.: WO2006/109563

PCT Pub. Date: Oct. 19, 2006

(65) Prior Publication Data

US 2008/0318748 A1 Dec. 25, 2008

(30) Foreign Application Priority Data

Apr. 7, 2005 (JP) ................................ 2005-110985

(51) Int. Cl.
*F16C 13/00* (2006.01)
*G03G 15/08* (2006.01)

(52) U.S. Cl. ............................ 492/56; 492/53; 399/286

(58) Field of Classification Search .................... 492/53, 492/56; 399/286
See application file for complete search history.

(56) References Cited

U.S. PATENT DOCUMENTS

| | | | | |
|---|---|---|---|---|
| 5,429,574 | A * | 7/1995 | Murakami | 492/39 |
| 5,863,626 | A * | 1/1999 | Yamasaki | 428/36.5 |
| 7,172,544 | B2 * | 2/2007 | Ki et al. | 492/56 |
| 7,341,813 | B2 * | 3/2008 | Shigezaki et al. | 430/66 |
| 7,462,146 | B2 * | 12/2008 | Nagata | 492/30 |
| 7,820,190 | B2 * | 10/2010 | Hossainy et al. | 424/423 |

FOREIGN PATENT DOCUMENTS

| | | | |
|---|---|---|---|
| JP | 5-281831 | A | 10/1993 |
| JP | 9-34272 | A | 2/1997 |
| JP | 11149201 | A * | 6/1999 |
| JP | 2002-82514 | A | 3/2002 |
| JP | 2002-310136 | A | 10/2002 |
| JP | 2004-191561 | A | 7/2004 |

OTHER PUBLICATIONS

Japanese Office Action dated Oct. 20, 2009 (3 pages).

* cited by examiner

*Primary Examiner* — Sarang Afzali
(74) *Attorney, Agent, or Firm* — Sughrue Mion, PLLC

(57) ABSTRACT

An electrical conductive roller 1 that includes a shaft member 2 born at both end portions in a lengthwise direction thereof, and one or more elastic layers 3 arranged on a radially outside thereof, where each elastic layer has a glass transition point of not higher than −40° C., and at least one of the elastic layers is constituted with a ultraviolet curing type resin containing an electrically conducting agent and a ultraviolet initiator.

7 Claims, 11 Drawing Sheets

(a)

(b)

ELECTRICAL CONDUCTIVE ROLLER

TECHNICAL FIELD

This invention relates to an electrical conductive roller used in an imaging apparatus, for example, an electrophotographic device or an electrostatic recording device such as a copier, a printer and the like, and more particularly to a reduction of a cost in the production of the electrical conductive roller.

RELATED ART

In the imaging apparatus using an electrophotographic system such as a copier, a printer or the like are used various electrical conductive rollers, which include a charge roller for giving charge to a latent image support such as a photosensitive drum or the like, a developing roller for feeding a non-magnetic developing agent (toners) to the latent image support for visualizing a latent image on the latent image support, a toner feed roller for feeding toners to the developing roller, a transfer roller used for transferring the toners on the latent image support to a recording medium such as a paper or the like, a middle transfer roller serving as an intermediary for toners, a cleaning roller for removing the toners retained on the latent image support, a belt driving roller for driving or driven-supporting an electrical conductive belt used in the imaging apparatus, and so on.

As the electrical conductive roller, there have hitherto been used ones obtained by forming an electrically conductive elastic layer made from an electrically conductive rubber, high polymer elastomer, high polymer foam or the like, which is compounded with an electrical conducting agent for giving a conductive property, on an outer periphery of an electrical conductive shaft member and, if necessary, forming a surface coating layer on an outer periphery thereof.

As the elastic layer are generally used ones having a glass transition point of not higher than −40° C. so as to elastically contact with the photosensitive drum or the like. Also, as a method for forming the elastic layer is usually used a shaping method wherein a material is poured into a mold and then cured in the mold because it is required to obtain a peripheral dimension in a high accuracy (for example, see Patent Document 1).

Patent Document 1: JP-A-2004-150610

DISCLOSURE OF THE INVENTION

Problems to be Solved by the Invention

In this method using the mold, however, it is required to use a great number of expensive molds if it is intended to increase the production volume, and hence the equipment cost becomes vast, which poses an impediment for reducing the product cost.

With the view of the above problems, it is an object of the invention to provide an electrical conductive roller capable of forming the elastic layer cheaply to largely reduce the product cost without sacrificing the dimensional accuracy of the outer periphery.

Means for Solving Problems

<1> An electrical conductive roller comprising a shaft member born at both end portions in a lengthwise direction thereof, and one or more elastic layers arranged on a radially outside thereof and having a glass transition point of not higher than −40° C., wherein at least one of the elastic layers is constituted with a ultraviolet curing type resin containing an electrically conducting agent and a ultraviolet initiator.

<2> An electrical conductive roller according to <1>, wherein the electrically conducting agent ins a carbon-based conducting agent, an ion conducting agent or a metal oxide, and when the carbon-based conducting agent is included as the electrically conducting agent, a substance having a maximum wavelength of a ultraviolet absorption wavelength zone of not less than 400 nm is included in the ultraviolet initiator.

The "ultraviolet absorption wavelength zone" used herein means a wavelength zone capable of providing sufficient energy for cleavage of the initiator, and a wavelength zone merely causing a slight amount of absorption is not included in the above absorption wavelength zone. Therefore, the case that the maximum wavelength of the ultraviolet absorption wavelength zone is not less than 400 nm means that the cleavage can be started sufficiently even at the wavelength zone of not less than 400 nm, but does not mean that the ultraviolet ray can be absorbed at this zone.

<3> An electrical conductive roller according to <1> or <2>, wherein one or more surface layers having a glass transition point of higher than −40° C. are arranged outside of an outermost elastic layer and such a surface layer is constituted with a ultraviolet curing resin containing an electrically conducting agent and a ultraviolet initiator.

<4> An electrical conductive roller comprising a shaft member born at both end portions in a lengthwise direction thereof, and one or more elastic layers arranged on a radially outside thereof and having a glass transition point of not higher than −40° C., wherein at least one of the elastic layers is constituted with an electron beam curing resin containing an electrically conducting agent.

<5> An electrical conductive roller according to <4>, wherein one or more surface layers having a glass transition point of higher than −40° C. are arranged outside of an outermost elastic layer and such a surface layer is constituted with an electron beam curing resin containing an electrically conducting agent.

<6> An electrical conductive roller according to <3> or <5>, a crosslinking density of the ultraviolet curing resin or electron beam curing resin in the elastic layer is made smaller than that of the surface layer.

<7> An electrical conductive roller according to <3>, <5> or <6>, wherein the roller is used as a developing roller for feeding a non-magnetic developing agent supported on an outer peripheral face thereof to a latent image support, and an outermost layer of the elastic layers is constituted with a resin dispersed with fine particles.

<8> An electrical conductive roller according to <7>, wherein the fine particles have an average particle size of 1-50 μm.

<9> An electrical conductive roller according to <7> or <8>, wherein a content of the fine particles in the outermost elastic layer is 0.1-100 parts by weight based on 100 parts by weight of the resin.

<10> An electrical conductive roller according to any one of <1>-<9>, wherein the shaft member is constituted with a metal pipe or a hollow cylindrical body or a solid cylinder made from a resin containing an electrically conducting agent.

EFFECTS OF THE INVENTION

According to <1>, at least one elastic layer is constituted with the ultraviolet curing resin containing the electrically conducting agent and the ultraviolet initiator, so that the elastic layer can be formed by applying a coating composition including these materials onto a periphery of the shaft member and irradiating ultraviolet ray to cure the composition, whereby the use of a mold obstructing the cost reduction is eliminated but also a drying step required in case of using a coating composition containing no ultraviolet curing resin is eliminated, which can largely contribute to the reduction of the product cost.

According to <2>, when the electrically conducting agent included in the ultraviolet curing resin is an ion conducting agent or a metal oxide, the desired conductive performances can be stably given without obstructing the arrival of the ultraviolet ray to the interior of the layer due to such an electrically conducting agent. Also, even when the electrically conducting agent is a carbon-based conducting agent, since the substance having a maximum wavelength of a ultraviolet absorption wavelength zone of not less than 400 nm is included in the ultraviolet initiator, a quantity of ultraviolet ray at the interior of the layer is decreased but the carbon-based conducting agent, but the ultraviolet curing reaction at such an interior can be promoted, and in this case the stable conductive performances can be guaranteed.

According to <3>, the surface layer having a glass transition point of higher than −40° C. is arranged outside the outermost elastic layer, so that the surface characteristics such as charging performance, adhesiveness, contamination resistance, abrasion resistance, friction force and the like can be optimized without being dependent upon elastic properties of the elastic layer. Further, the surface layer is constituted with the ultraviolet curing resin containing the electrically conducting agent and the ultraviolet initiator, so that the surface layer is cured by the same device as used in the elastic layer, and hence it is not necessary to arrange a new equipment and also the surface layer can be formed in a short time efficiently.

According to <4>, at least one elastic layer is constituted with the electron beam curing resin containing the electrically conducting agent, so that the elastic layer can be formed by applying a coating composition including these materials onto the periphery of the shaft member and irradiating electron beams to cure the composition, whereby the use of a mold obstructing the cost reduction is eliminated but also a drying step required in case of using a coating composition containing no electron beam curing resin is eliminated, which can largely contribute to the reduction of the product cost.

According to <5>, the surface layer having a glass transition point of higher than −40° C. is arranged outside the outermost elastic layer, so that the surface characteristics such as charging performance, adhesiveness, contamination resistance, abrasion resistance, friction force and the like can be optimized without being dependent upon elastic properties of the elastic layer. Further, the surface layer is constituted with the electron beam curing resin containing the electrically conducting agent, so that the surface layer is cured by the same device as used in the elastic layer, and hence it is not necessary to arrange a new equipment and also the surface layer can be formed in a short time efficiently.

According to <6>, the crosslinking density of the ultraviolet curing resin or electron beam curing resin in the elastic layer is made smaller than that in the surface layer, so that the optimum elastic properties for each layer can be obtained without largely differing base compounds between the elastic layer and the surface layer, and also the product cost can be more reduced.

According to <7>, the roller is used as a developing roller for feeding a non-magnetic developing agent supported on the outer peripheral face thereof to a latent image support and the outermost elastic layer is constituted with the fine particles dispersed resin, so that the irregularity can be formed on the outer surface of the surface layer made of a thin film by protruding the fine particles from the outermost elastic layer, and hence the surface roughness enough to provide the desired toner feeding ability can be given to the surface layer. Further, the particles in the outermost elastic layer do not directly contact with the latent image support such as the photosensitive drum or the like, so that there can be prevented the deterioration of the properties of the particle associated with the long-term use.

According to <8>, since the average particle size of the fine particles is 1-50 μm, when it is less than 1 μm, the sufficient surface roughness is not obtained, and hence the toner transferring force is lowered to bring about the deterioration of the printing quality such as deterioration of image concentration or the like, while when it exceeds 50 μm, the surface roughness becomes too large, and the toner transferring force is excessive and the adequate toner charging property can not be ensured.

According to <9>, since the content of the fine particles in the outermost elastic layer is 0.1-100 parts by weight per 100 parts by weight of the resin, when the content of the fine particles is less than 0.1 part by weight per 100 parts by weight of the resin, the ratio of the fine particles existing on the surface of the elastic layer is too small and the sufficient surface roughness can not be given to the electrical conductive roller, while when it exceeds 100 parts by weight, the ratio of the fine particles to the resin becomes too large and there is a possibility of obstructing the development of the function of the resin.

According to <10>, the shaft member is constituted with the metal pipe or the hollow cylindrical body or solid cylinder made from the resin containing the electrically conducting agent, so that the weight of the roller as a whole can be reduced while ensuring the desired conductive property.

DESCRIPTION OF REFERENCE SYMBOLS

| | |
|---|---|
| 1 | electrical conductive roller |
| 2 | shaft member |
| 3 | elastic layer |
| 4 | surface layer |
| 5 | solid cylinder |
| 6 | shaft portion |
| 7 | gear portion |
| 8 | bearing portion |
| 11 | electrical conductive roller |
| 12 | shaft member |
| 13 | hollow cylindrical body |
| 13a | cylindrical portion |
| 13b | bottom portion |
| 14 | cap member |
| 14a | lid portion |
| 21 | electrical conductive roller |
| 22 | shaft member |
| 23 | hollow cylindrical body |
| 23a | cylindrical portion |
| 23b | bottom portion |
| 24 | cap member |
| 24a | lid portion |
| 30 | mold |
| 31 | cylindrical mold segment |
| 32 | core mold segment |
| 33 | runner mold segment |
| 34 | second sprue |
| 35 | cavity |
| 36 | first sprue |
| 37 | runner |
| 51 | electrical conductive roller |
| 52 | shaft member |
| 53 | hollow cylindrical body |
| 54 | cylindrical member |
| 55 | reinforcing rib |
| 56 | metal shaft |
| 57 | gear portion |
| 61A | end portion of cylindrical member |
| 61B | other end portion of cylindrical member |
| 62 | convex portion |
| 63 | rotating stop pin |
| 65 | concave portion |
| 66 | rotating stop hole |
| 70, 70A | die coater |
| 71, 71A | upper die head |
| 72, 72A | lower die head |
| 73, 73A | feed pipe |
| 74 | manifold |
| 75 | feed pipe |
| 76, 76A | constant-volume pump |
| 77 | opening portion |
| 78 | ultraviolet ray irradiation means or electron beam irradiation means |
| 80 | roll coater |
| 81 | coating roll |
| 82 | coating composition tank |
| 84 | roll-driving motor |
| 86 | doctor blade |
| 87 | opening portion |
| 88 | ultraviolet ray irradiation means or electron beam irradiation means |

BEST MODE FOR CARRYING OUT THE INVENTION

Figure 1:
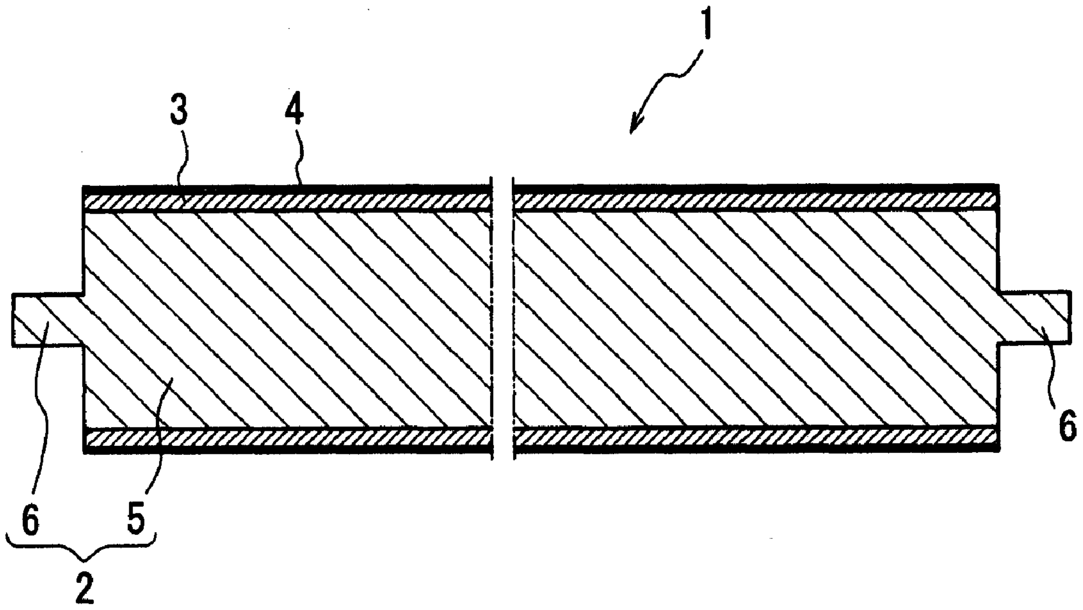
FIG. 1 is a section view of an embodiment of the electrical conductive roller according to the invention.

Embodiments of the invention are further described in detail. FIG. 1 is a section view of an embodiment of the electrical conductive roller according to the invention. The electrical conductive roller 1 is constituted by forming an electrically conductive elastic layer 3 on an outer periphery of a shaft member 2 and further forming an electrically conductive surface layer 4 on the elastic layer 3, but the surface layer 4 is not an essential construction. As the shaft member 2 may be used a solid cylinder or a hollow cylindrical body made of a metal or a resin. In order to reduce the weight of the electrical conductive roller as a whole, however, when the shaft member is made of a metal, it is preferable to be a hollow cylindrical body, while when it is made of a resin, it is preferable to be a solid cylinder or a hollow cylindrical body. The embodiment shown in FIG. 1 is a solid cylinder made of a resin. The shaft member 2 comprises a solid cylinder 5 made of a resin and shaft portions 6 formed on both ends thereof. These shaft portions are born by roller supporting portions of an electrophotographic device not shown at an attached state.

At first, the shaft member 2 will be described below. Since the shaft member 2 is made of a resin, the diameter of the shaft member 2 may be made large without largely increasing the weight. Also, since the resin containing an electrically conducting agent, the shaft member 2 has a good conducting property, which can give a desired potential to the surface of the electrical conductive roller 1.

A resin material used in the shaft member 2 is not particularly limited as far as it has a proper strength and can be shaped by an injection molding or the like, and may be properly selected from general-purpose resins and engineering plastics. As the engineering plastics, mention may be made of polyacetal, polyamide resin (for example, polyamide 6, polyamide 6/6, polyamide 12, polyamide 4/6, polyamide 6/10, polyamide 6/12, polyamide 11, polyamide MXD6 (polyamide obtained from metaxylene diamine and adipic acid) or the like), polybutylene terephthalate, polyphenylene oxide, polyphenylene ether, polyphenylene sulfide, polyether sulfon, polycarbonate, polyimide, polyamide imide, polyether imide, polysulfon, polyether ether ketone, polyethylene terephthalate, polyarylate, liquid crystal polymer, polytetrafluoroethylene and so on. As the general-purpose resin are mentioned polypropylene, acrylonitrile-butadiene-styrene (ABS) resin, polystyrene, polyethylene and so on. Also, melamine resin, phenol resin, silicone resin and the like may be used. They may be used alone or in a combination of two or more.

Among them, the engineering plastics are particularly preferable, and further polyacetal, polyamide resin, polybutylene terephthalate, polyphenylene ether, polyphenylene sulfide, polycarbonate and the like are preferable in a point that they are thermoplastic and are excellent in the shapability and the mechanical strengths. Particularly, polyamide 6/6, polyamide MXD6, polyamide 6/12 and a mixture thereof are preferable. Moreover, thermosetting resins may be used, but it is preferable to use the thermoplastic resin considering the recycle property.

As the electrically conducting agent, various ones may be used as far as they can be uniformly dispersed into the resin material, but there are preferably used powdery conducting agents, for example, carbon black powder, graphite powder, carbon fibers, metal powder of aluminum, copper, nickel or the like, powder of a metal oxide such as tin oxide, titanium oxide, zinc oxide or the like, electrically conductive glass powder and so on. They may be used alone or in a combination of two or more. The amount of the electrically conducting agent compounded may be selected so as to provide a proper resistance value in accordance with applications and conditions of the electrical conductive roller to be targeted and is not particularly limited, but it is usually 5-40% by weight, particularly 5-20% by weight based on the whole of the materials of the shaft member 2.

The volume resistivity of the shaft member 2 may be properly selected in accordance with the application and the like of the roller as mentioned above, but it is usually $1\times10^{0}$-$1\times10^{12}$ Ωcm, preferably $1\times10^{2}$-$1\times10^{10}$ Ωcm, more preferably $1\times10^{5}$-$1\times10^{10}$ Ωcm.

The materials for the shaft member 2 may be compounded with various conductive or non-conductive fibrous materials, whiskers, ferrite and the like for the purpose of reinforcement, weight increase and the like, if necessary. As the fibrous material may be mentioned, for example, fibers such as carbon fiber, glass fiber and the like. As the whisker may be mentioned inorganic whiskers such as potassium titanate and the like. They may be used alone or in a combination of two or more. The amount of them compounded may be properly selected in accordance with length and diameter of the fibrous material or whisker used, kind of the resin material as a main component, strength of the roller to be targeted and so on, but it is usually 5-70% by weight, particularly 10-20% by weight of the total of the materials.

Since the shaft member 2 constitutes a core portion of the electrical conductive roller 1, it is required to have a sufficient strength for stably developing the good performances as a roller. Usually, it is preferable to have a strength of not less than 80 MPa, particularly not less than 130 MPa as a bending strength defined according to JIS K7171, which can surely develop the good performances over a long time of period. Moreover, the upper limit of the bending strength is not particularly limited, but it is generally not more than about 500 MPa.

Figure 2:
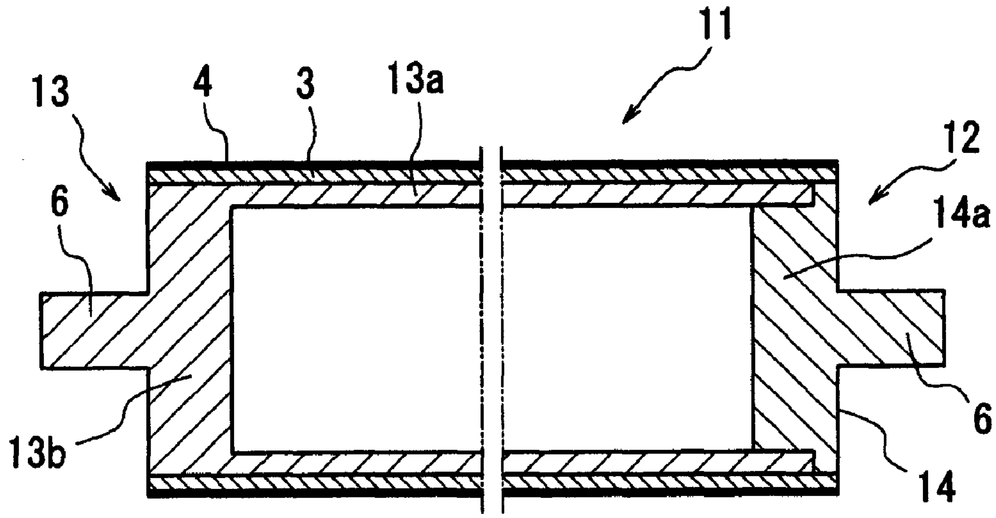
FIG. 2 is a section view of another embodiment of the electrical conductive roller.

In FIG. 1 is shown a solid cylinder 5 as the shaft member 2, while FIG. 2 is a section view of an electrical conductive roller 11 using a shaft member 12 made of a hollow cylindrical resin body 13 instead of the shaft member 2. The electrical conductive roller 11 is the same as the electrical conductive roller 1 in a point that the elastic layer 3 and the surface layer 4 are formed on the outside of the shaft member 12 in this order. The shaft member 12 is formed by joining a hollow cylindrical body 13 to a cap member 14 through adhesion or the like, in which the hollow cylindrical body 13 comprises a cylindrical portion 13*a*, a bottom portion 13*b* and a shaft portion 6 and the cap member 14 comprises a lid portion 14*a* and a shaft portion 6. Both the shaft portions 6 are born by a roller supporting portion of an electrophotographic device not shown at an attached state.

By using the hollow shaft member 12 instead of the shaft member 2 can be more reduced the weight of the electrical conductive roller 11. Particularly, when the outer diameter of the electrical conductive roller exceeds 12 mm, it is preferable to have a hollow structure.

Figure 3:
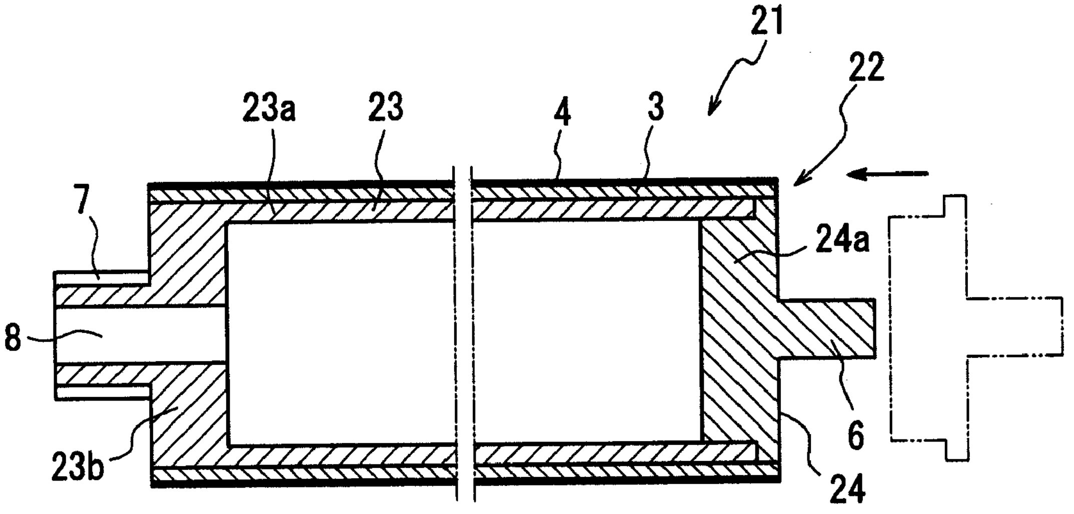
FIG. 3 is a section view of the other embodiment of the electrical conductive roller.
Figure 4:
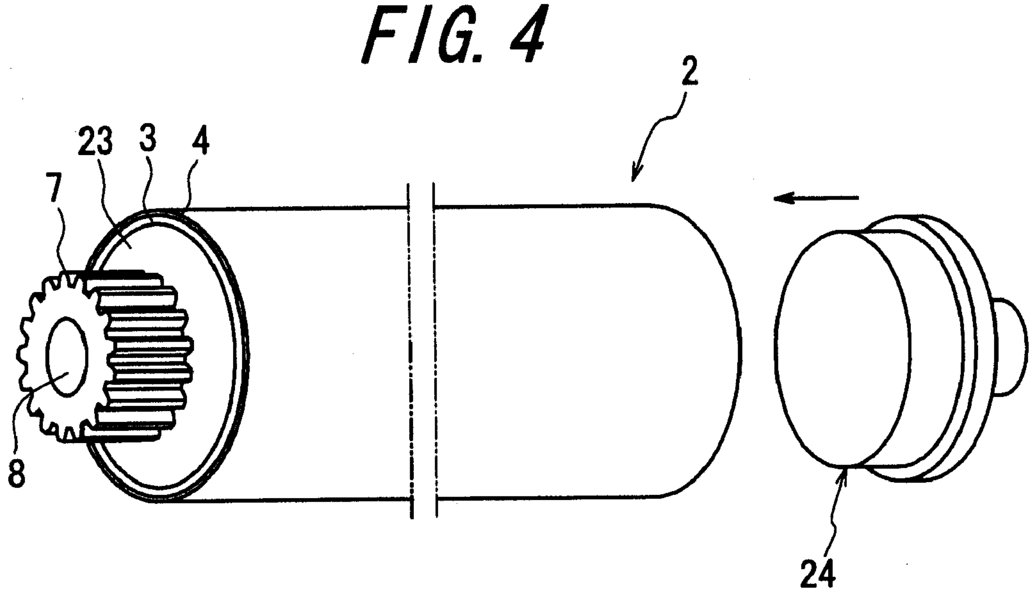
FIG. 4 is a perspective view of the electrical conductive roller of the embodiment shown in FIG. 3.

FIG. 3 is a section view of an electrical conductive roller 21 using a shaft member 22 instead of the shaft member 12, and FIG. 4 is a perspective view thereof. The shaft member 22 is formed by joining a hollow cylindrical body 23 to a cap member 24 through adhesion or the like, in which the hollow cylindrical body 23 comprises a cylindrical portion 23*a*, a bottom portion 23*b*, a gear portion 7 and a bearing portion 8, and the cap member 24 comprises a lid portion 24*a* and a shaft portion 6 likewise the electrical conductive roller 11.

The shaft portion 6 and the bearing portion 8 are born by a roller supporting portion of an electrophotographic device not shown, while a rotation driving force of the electrical conductive roller is directly transmitted to the shaft member 22 through the gear portion 7. Even in the hollow cylindrical body 23 having the gear portion 7, since the shaft member 22 is made from the resin, they can be integrally shaped by an injection molding or the like, so that the cost of the shaft member 22 can be reduced as compared with a case that the shaft member is made of a metal and the gear portion should be a separate member. Moreover, the gear portion 7 may be integrally shaped even if it is a spur gear or a spiral gear.

Also, the thickness of the hollow cylindrical body 13*a* or 23*a* is preferable to be thin in view of the weight reduction as far as the strength is sufficient. The thickness may be 0.3-3 mm, more preferably 1-2 mm.

The method of forming the shaft members 2, 12, 22 with the compounded material comprising the aforementioned resin material, electrically conducting agent and the like is not particularly limited and may be properly selected from the well-known shaping methods in accordance with the kind of the resin material and the like, but the injection molding method using the mold is usually applied.

Figure 5:
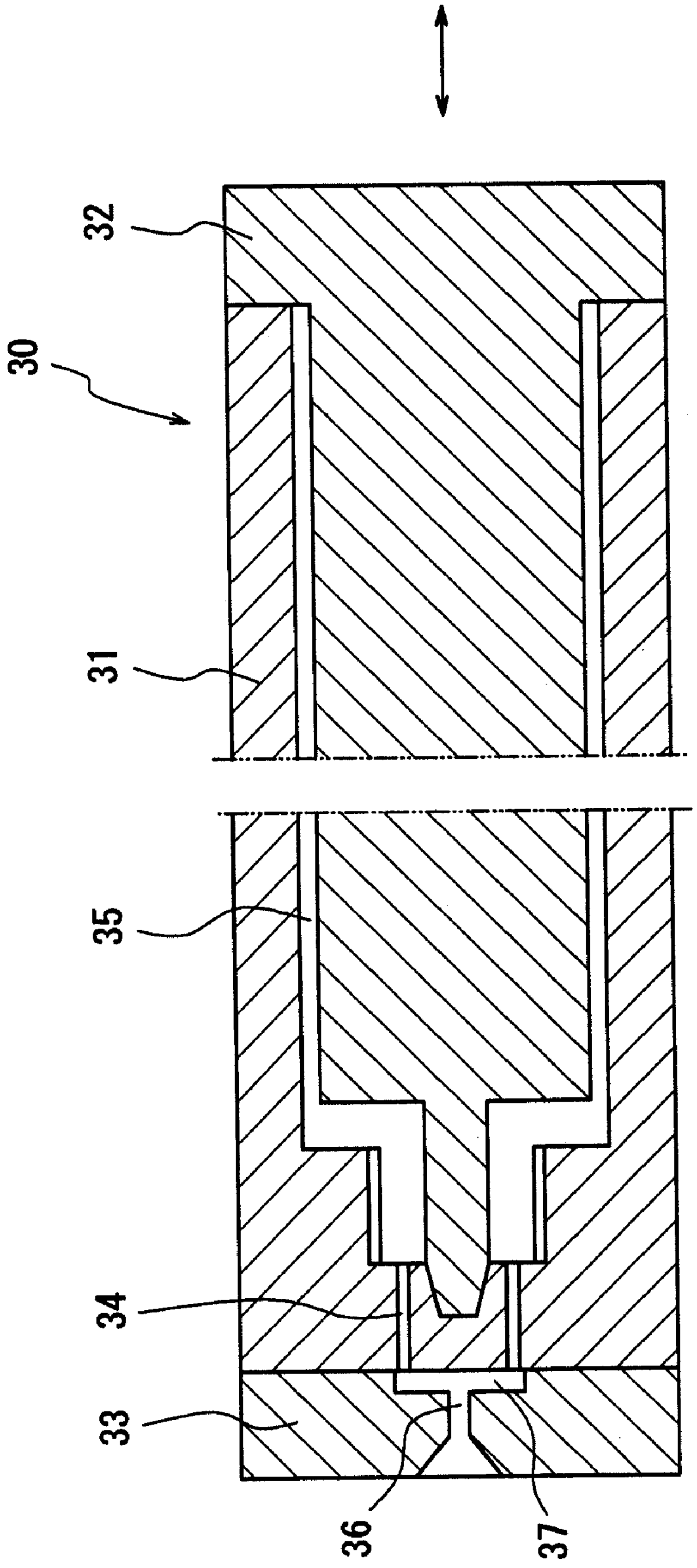
FIG. 5 is a section view of a mold forming a hollow cylindrical body.

FIG. 5 is a section view of a mold 30 forming the hollow cylindrical body 23 at a closed state. The mold 30 comprises a cylindrical mold segment 31, a core mold segment 32 and a runner mold segment 33. The opening and closing of the mold is carried out by separating away and approaching these mold segments to each other in a longitudinal direction of the cylindrical mold segment 31. At the closed state of the mold 30, a resin is poured into a cavity 35 defined by the cylindrical mold segment 31 and the core mold segment 32 from a first sprue 36 through a runner 37 and a second sprue 34, and thereafter cooled and solidified in the mold 30 to form the hollow cylindrical body 23. Also, the material in the runner 37 can be laconically utilized by using a hot runner system.

At this moment, the cylindrical mold segment 31 and the core mold segment 32 have a structure not divided in the peripheral direction, so that the hollow cylindrical body 23 may be made uniform in the peripheral direction. Also, the hollow portion can be formed by a pressure of an inert gas introduced instead of using the core mold segment 32.

Figure 6:
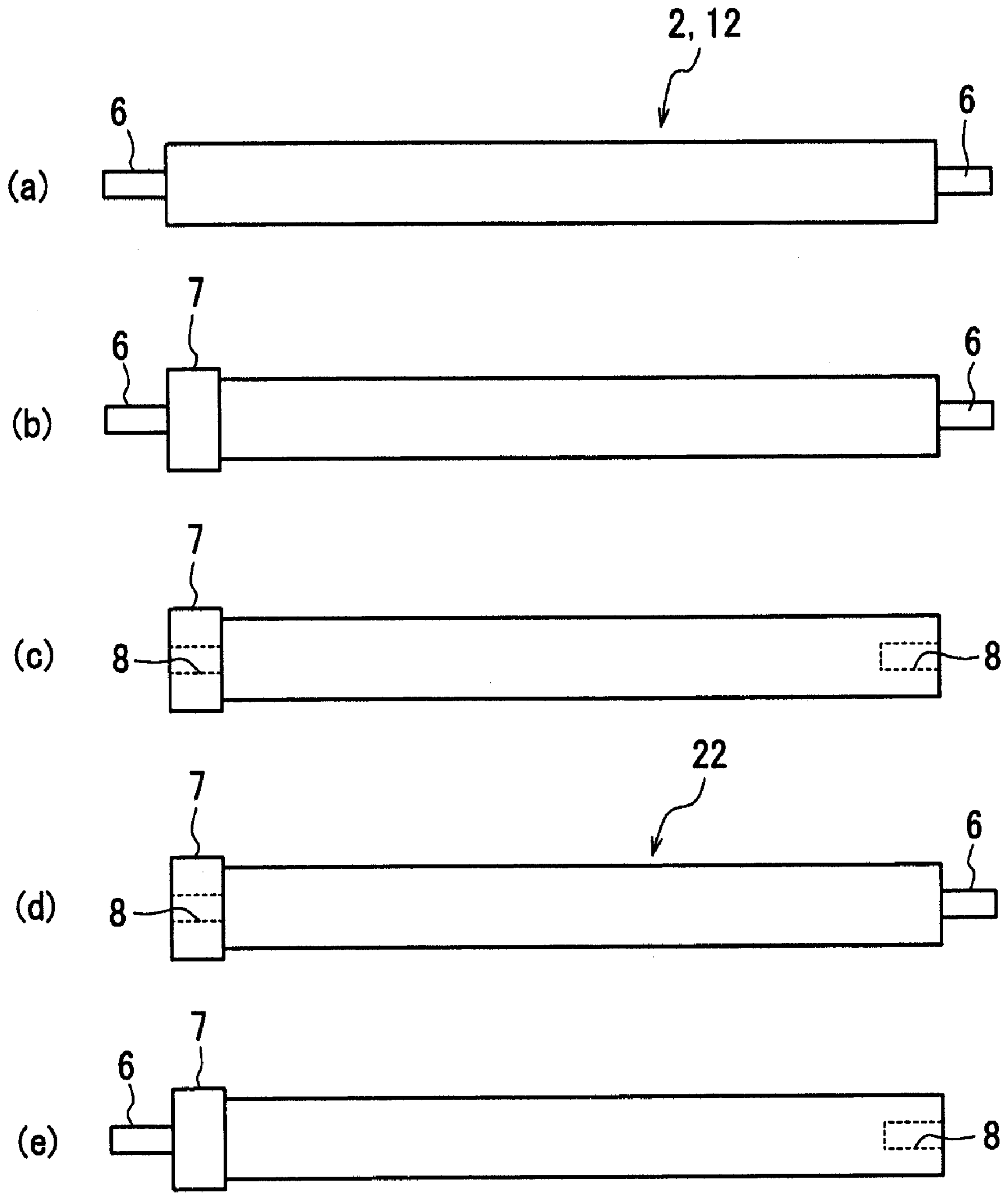
FIG. 6 is a side view of a shaft member having end portions of different structures.

FIG. 6 is a side view of a shaft member having different end portion structure, in which FIGS. 6(*a*) and 6(*b*) are an example that both the end portions are constituted with the shaft portion 6, FIG. 6(*c*) is an example that both the end portions are constituted with the bearing portion 8, and FIGS. 6(*d*) and 6(*e*) are an example that one of both the end portions is constituted with the shaft portion 6 and the other is constituted with the bearing portion 8. Also, the examples of FIGS. 6(*b*)-6(*e*) show an example that the one end portion is provided with the gear portion 7. In addition, the gear portions 7 may be arranged on both the end portions, and in this case the shaft member bear the function of mediating the power transmission. In any case, the gear portion 7 can be integrally formed with the cylindrical portion or columnar portion.

The shaft member shown in FIG. 6(*a*) corresponds to the shaft member 2 or 12, and that shown in FIG. 6(*d*) corresponds to the shaft member 22.

Figure 7:
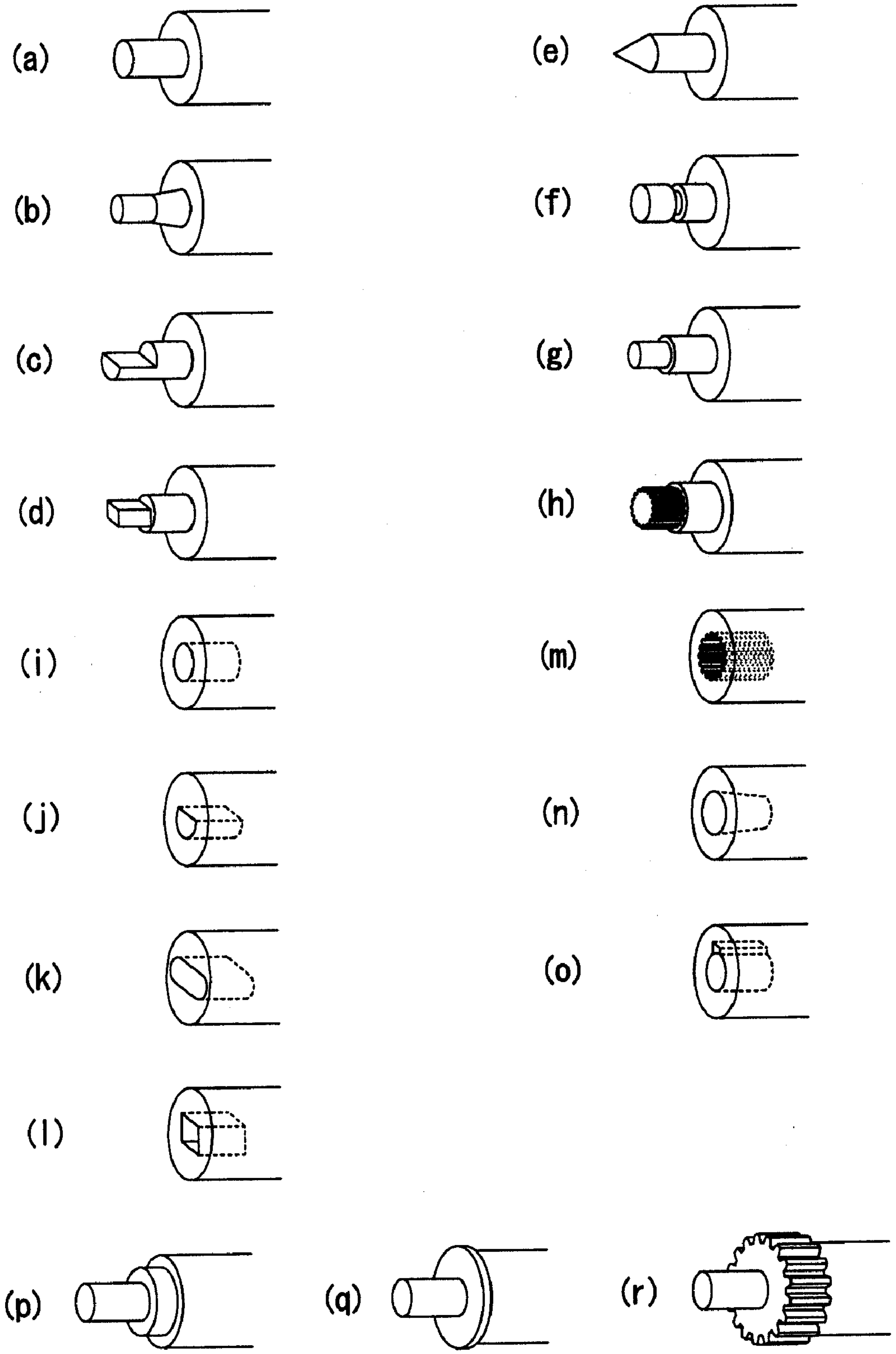
FIG. 7 is a perspective view illustrating shape-modified examples of a shaft portion, a bearing portion and a gear portion.

Also, the shaft portion 6 of the shaft member 2, 12 shown in FIG. 6 has a simplest cylindrical form as shown by a perspective view in FIG. 7(*a*). Instead, there can be used a tapered portion shown in FIG. 7(*b*), a D-cut worked portion shown in FIG. 7(*c*), a prismatic portion shown in FIG. 7(*d*), a top-pointed portion shown in FIG. 7(*e*), an annular groove-containing portion shown in FIG. 7(*f*), a stepped portion shown in FIG. 7(*g*), a portion having on its outer peripheral face a spline or outer tooth for gear shown in FIG. 7(*h*) and the like. Similarly, as the bearing portion 8, there can be used a simple round-shaped hole portion shown by a perspective view in FIG. 7(*i*), a D-shaped sectional hole portion shown in FIG. 7(*j*), an oval sectional hole portion shown in FIG. 7(*k*), a square hole portion shown in FIG. 7(*l*), a portion having in its inner peripheral face a spline or inner tooth for gear shown in FIG. 7(*m*), a tapered hole portion shown in FIG. 7(*n*), a key-grooved round hole portion shown in FIG. 7(*o*) and the like.

Further, a stepped portion shown in FIG. 7(*p*), a flanged portion shown in FIG. 7(*q*) and the like can be used instead of the gear portion 7 shown by a perspective view in FIG. 7(*r*).

Figure 8:
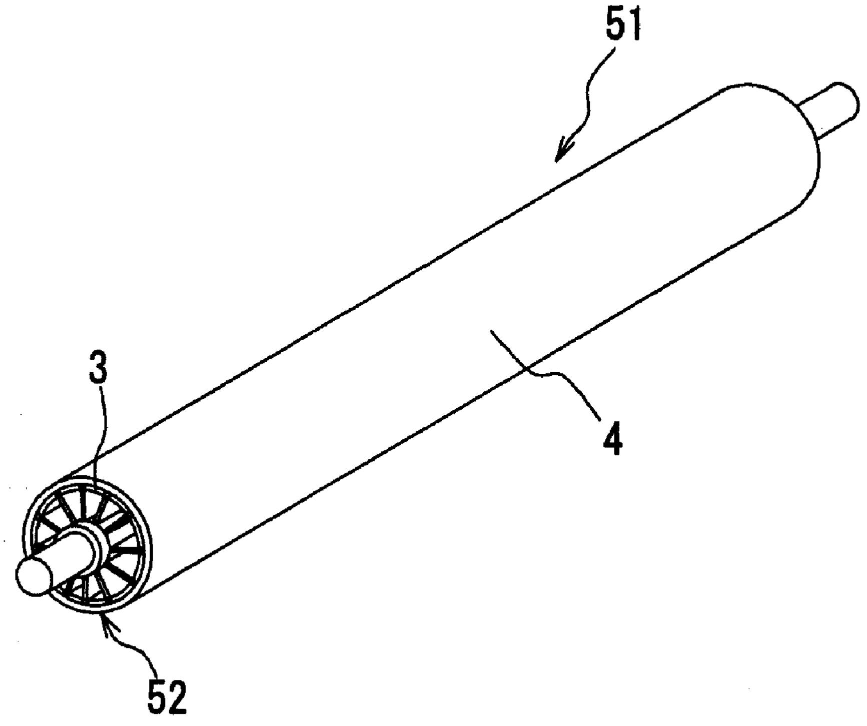
FIG. 8 is a perspective view of a further embodiment of the conductive roller.
Figure 9:
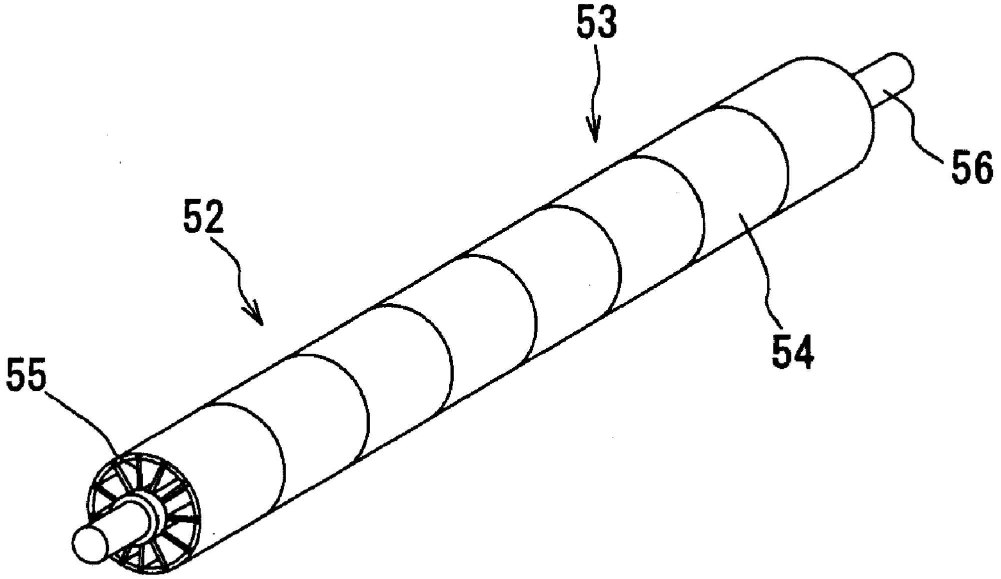
FIG. 9 is a perspective view of a shaft member in the electrical conductive roller of FIG. 8.

FIG. 8 is a perspective view of an electrical conductive roller 51 using a shaft member 52 instead of the shaft member 12 shown in FIG. 2, and FIG. 9 is a perspective view of the shaft member 52. The shaft member 52 comprises a hollow cylindrical body 53 and a metal shaft 56. The hollow cylindrical body 53 is provided with reinforcing ribs 55 extending inward from the outer peripheral surface in the radial direction. Also, the hollow cylindrical body 53 is constructed by connecting a plurality of cylindrical members 54 to each other in the longitudinal direction. Thus, the hollow cylindrical body 53 is comprised of plural cylindrical members 54 and divided in the longitudinal direction, so that the length of each member becomes short as compared with the conventional case of the integrally united product of the metal pipe and the resin, and hence the working precision can be improved but also the working of each member can be made easy and contribute to the improvement of the productivity.

In the radial center of the hollow cylindrical body 53 is arranged the metal shaft 56 passing through the hollow cylindrical body, and radially inner ends of the reinforcing ribs 55 are supported by the metal shaft 56, so that the rigidity of the roller can be enhanced to increase the strength to bending.

Figure 10:
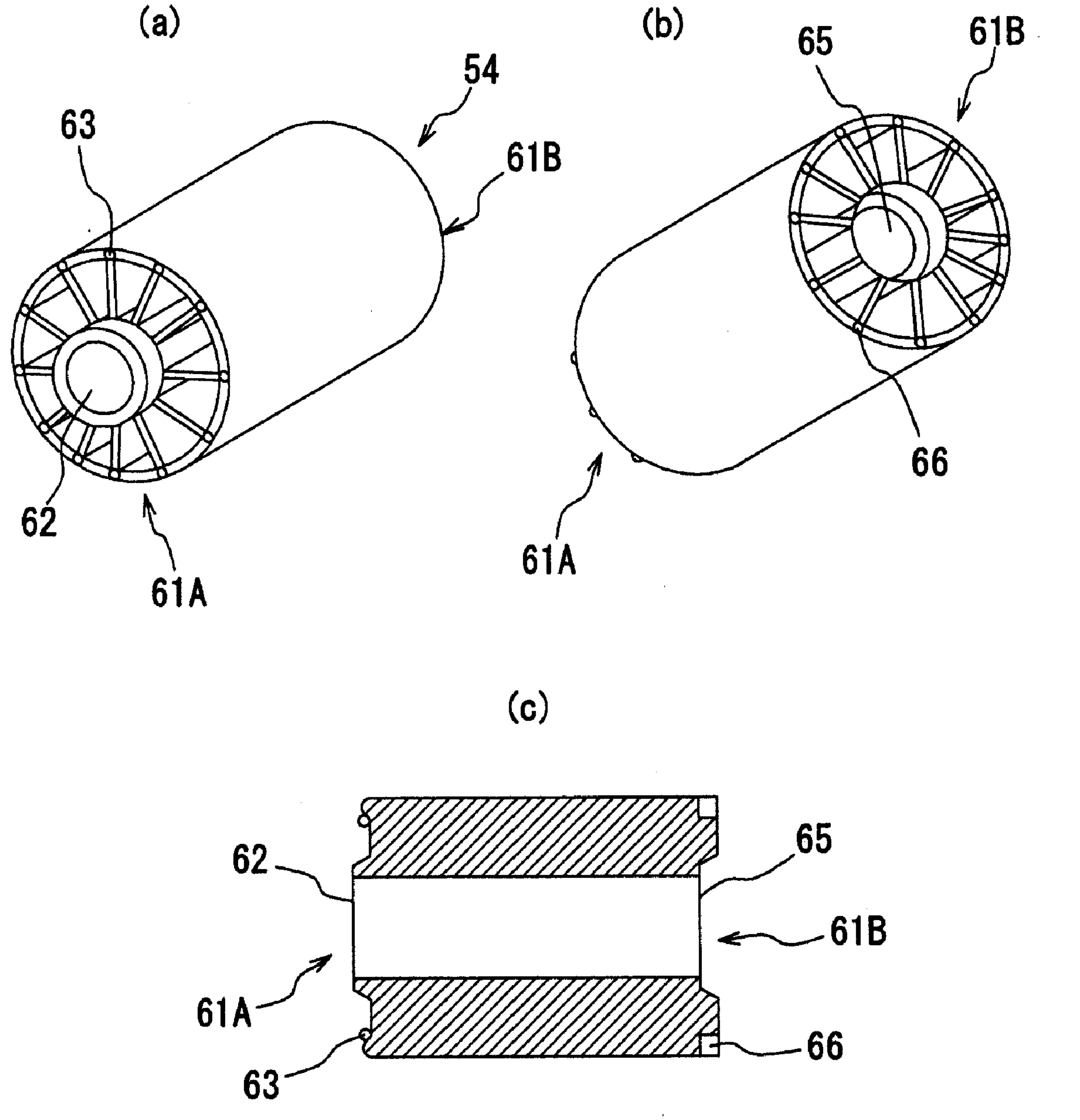
FIG. 10 is a perspective view and section view of a cylindrical body.

The means for connecting the cylindrical members 54 to each other is not particularly limited, but a structure shown in FIG. 10 can be exemplified, and the bonding can be carried out by the fitting between the end portions thereof. The illustrated cylindrical member 54 has a convex portion 62 and a rotating stop pin 63 at a side of its one end portion 61A (FIG. 10(*a*)) and a concave portion 65 and a rotating stop hole 66 at a side of the other end portion 61B (FIG. 10(*b*)). FIG. 10(*c*) is a section view of the cylindrical member 54. The cylindrical members 54 having such a structure can be strongly bonded to each other by fitting the end portion 61A into the end portion 61B at opposed state while rotating the members so as to fit the convex portion 62 into the concave portion 65 and the rotating stop pin 63 into the rotating stop hole 66, respectively. Since the roller is used under rotation, the connecting means between the members is preferable to have a rotation preventing mechanism. Moreover, the convex portion 62 and concave portion 65 are subjected to a tapering work for positioning in the illustrated cylindrical member 54.

Figure 11:
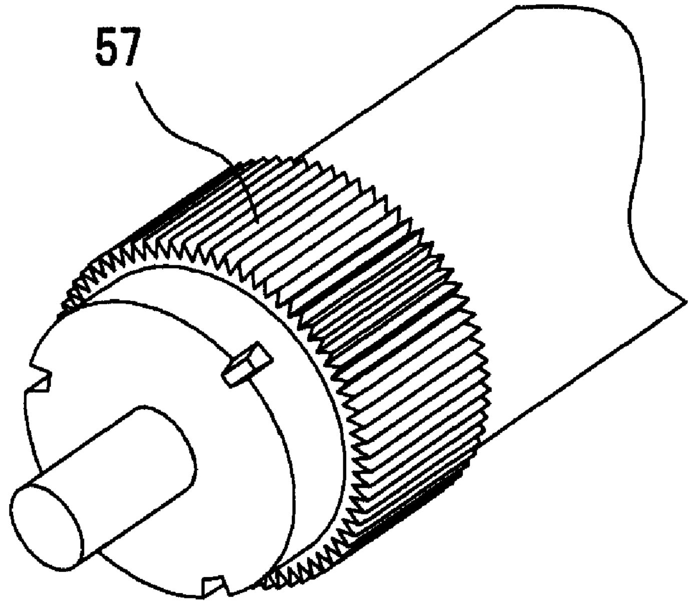
FIG. 11 is a perspective view illustrating a modified example of the shaft member shown in FIG. 9.

In the invention, the form of the shaft member 52 itself is not particularly limited, and may take a properly desired form. For example, a gear portion 57 (see FIG. 11) or a shaft portion of a proper form such as D-cut form or the like formed on the member corresponding to the end portion of the member in the longitudinal direction, or a member of only a gear portion is joined to an end portion after the formation of a roller main body, whereby the form of these functional parts can be arranged in the longitudinally end portions of the shaft member 52. Thus, there are obtained merits that it is made redundant to use the shaft separately or conduct the complicated working of the shaft and the positioning of the functional parts becomes easy.

Figure 12:
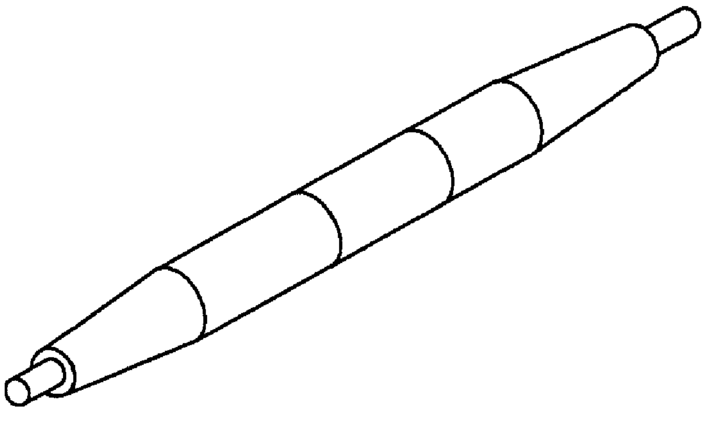
FIG. 12 is a perspective view illustrating another modified example of the shaft member shown in FIG. 9.

Also, the outer profile of the shaft member 52 is not limited to the cylindrical form shown in FIG. 9 and the like, and may have a crown form increasing a diameter from the longitudinally end portions toward a central portion as shown in FIG. 12. In case of the conventional integrally shaped product of the metal pipe and the resin, the outer profile of the roller main body is generally a straight cylindrical form, and is difficult to cope with the crown form in which the diameter in the central portion is larger than that of the end portion because it is required to conduct the shaping with a mold prepared in a higher production cost or to polish the elastic layer 3 or control the thickness in the formation of the coating layer 4 (dipping or the like). In this embodiment, the hollow cylindrical body 53 is divided into plural members in the longitudinal direction to lower the working level of each of the members, so that it is possible to easily cope with the crown form or the like and also it is possible to well ensure the working precision. Moreover, the number of the members constituting the roller main body is not particularly limited, and may be properly determined from a viewpoint of the strength, economical cost and the like.

As the material forming the hollow cylindrical body 53 can be used the same as previously described in the shaft member 2. As the metal shaft 56 can be used, for example, a resulphurized carbon steel, and nickel or zinc plated aluminum, stainless steel and the like.

The bonding between the hollow cylindrical body 53 and the metal shaft 56 is not particularly limited, and is usually carried out by using a conventional adhesive or the like. For example, there can be used a method wherein the hollow members 54 are heated in an oven or the like while passing the metal shaft 56 therethrough and thereafter cooled to shrink the resin material of the hollow member 54 and fix to the metal shaft 56. Furthermore, as the bonding means, it is preferable to form a groove, D-cut or the like in the metal shaft 56 (not shown). In the latter bonding means, it is preferable to have a rotation preventing mechanism likewise the previously mentioned member, which can prevent the idling of the meal shaft 56 in use.

Figure 13:
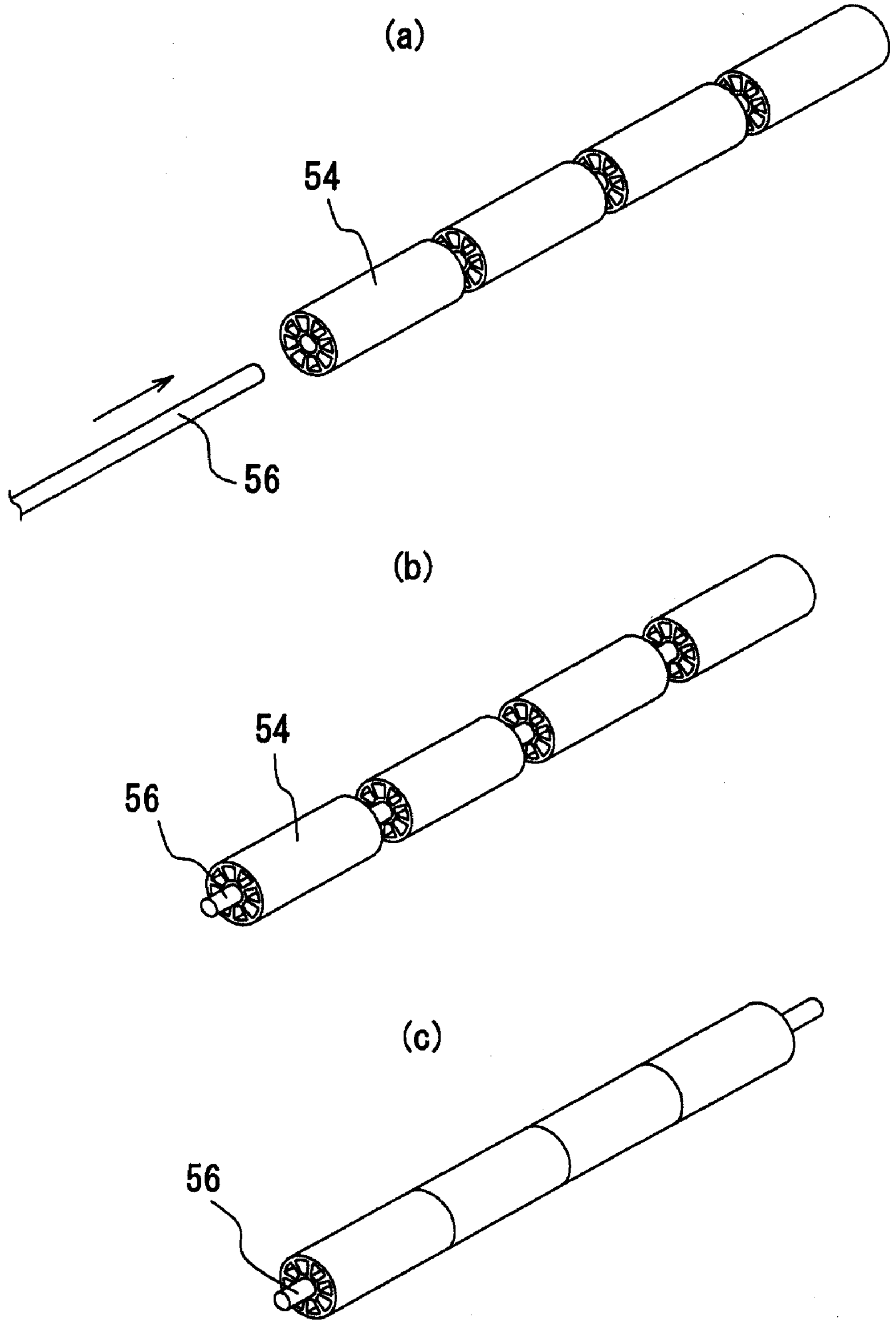
FIG. 13 is a perspective view illustrating a method of connecting cylindrical bodies.

The electrical conductive roller 51 can be produced by connecting a plurality of cylindrical members 54 to each other in the longitudinal direction to form the shaft member 52 and then forming the elastic layer 3 on the outer periphery thereof. The procedure of forming the hollow cylindrical body 53 from the cylindrical members 54 is not particularly limited, but in case of the cylindrical members 54 having the fitting structure as shown in FIG. 10, these members may be directly bonded to each other to form the hollow cylindrical body 53. If the member has not the fitting structure, as shown in FIGS. 13(*a*)-(*c*), there may be used a method wherein the cylindrical members 54 are fixed to each other with an adhesive or the like after the metal shaft 56 is successively passed through these members 54.

In case of using the shaft member made of the metal, it is preferable to be the hollow cylindrical body as shown in FIG. 2 in view of the weight reduction. As the metal material may be exemplified a metal selected from aluminum, stainless steel, iron and an alloy including any of them.

Next, the elastic layer 3 will be described. The elastic layer 3 has a glass transition point of not higher than −40° C. and is made from a ultraviolet curing type resin containing an electrically conducting agent and a ultraviolet initiator or an electron beam curing type resin containing an electrically conducting agent.

As the ultraviolet curing type resin or electron beam curing type resin forming the elastic layer 3 are mentioned polyester resin, polyether resin, fluorine resin, epoxy resin, amino resin, polyamide resin, acrylic resin, acrylurethane resin, urethane resin, alkyd resin, phenolic resin, melamine resin, urea resin, silicone resin, polyvinyl butyral resin, vinyl ether based resin, vinyl ester based resin and the like. They may be used alone or in a combination of two or more.

Further, there may be used a modified resin formed by introducing a specified functional group into each of these resins. Also, in order to improve the dynamic strength and environmental resistance of the resin layer 4, it is preferable to introduce a group having a crosslinking structure.

Among the above ultraviolet curing type resins or electron beam curing type resins is particularly preferable a composition formed from (metha)acrylate containing (metha)acrylate oligomer.

As the (metha)acrylate oligomer may be mentioned urethane-based (metha)acrylate oligomer, epoxy-based (metha) acrylate oligomer, ether-based (metha)acrylate oligomer, ester-based (metha)acrylate oligomer, polycarbonate-based (metha)acrylate oligomer, fluorine-based or silicon-based (metha)acrylater oligomer and so on.

The above (metha)acrylate oligomer may be synthesized by reaction of a compound such as polyethylene glycol, polyoxypropylene glycol, polytetramethylene ether glycol, bisphenol A-type epoxy resin, phenol novolac type epoxy resin, addition product of polyhydric alcohol and ε-caprolactam or the like with (metha)acrylic acid, or urethanation of polyisocyanate compound and (metha)acrylate compound having a hydroxyl group.

The urethane-based (metha)acrylate oligomer can be obtained by urethanation of polyol, isocyanate compound and (metha)acrylate compound having a hydroxyl group.

As an example of the epoxy-based (metha)acrylate oligomer may be mentioned all reaction products between compounds having glycidyl group and (metha)acrylic acid. Among them, a reaction product between (metha)acrylic acid and a compound having a cyclic structure such as benzene ring, naphthalene ring, spiro ring, dicycliopentadiene, tricyclodecane or the like and a glycidyl group is preferable.

Furthermore, the ether-based (metha)acrylate oligomer, ester-based (metha)acrylate oligomer and polycarbonate-based (metha)acrylate oligomer can be obtained by the reaction between the respective polyol (polyether polyol, polyester polyol and polycarbonate polyol) and (metha)acrylic acid.

The ultraviolet curing type or electron beam curing type resin composition is compounded with a reactive diluent having a polymerizable double bond for adjusting the viscosity, if necessary. As the reactive diluent may be used a monofunctional, difunctional or polyfunctional polymerizable compound having a structure formed by esterification and amidation between amino acid or a compound having a hydroxyl group and (metha)acrylic acid, and so on. Such a diluent is preferable to be usually used in an amount of 10-200 parts by weight based on 100 parts by weight of (metha)acrylate oligomer.

In the ultraviolet curing type or electron beam curing type resin for the elastic layer 3 is included an electrically conducting agent for the purpose of controlling the conductive property of the elastic layer 3. As the electrically conducting agent may be used any of electron conducting agent and ion conducting agent. In case of the electron conducting agent, carbon-based conducting agent is preferable in a point that a high conductive property can be obtained at a small addition amount. As the carbon-based conducting agent is preferably used Ketjenblack or acetylene black, but carbon black for rubber such as SAF, ISAF, HAF, FEF, GPF, SRF, FT, MT or the like, carbon black for ink such as oxide carbon black or the like, thermally decomposed carbon black, graphite and so on may be also used.

As the electron conducting agent other than the carbon-based conducting agent may be mentioned fine particles of a metal oxide such as ITO, tin oxide, titanium oxide, zinc oxide or the like; an oxide of a metal such as nickel, copper, silver, germanium or the like; a transparent whisker such as electrically conductive titanium oxide whisker or electrically conductive barium titanate whisker; and so on.

As the ion conducting agent may be mentioned an organic ion conducting agent such as perchlorate, chlorate, hydrochloride, bromate, iodate, borofluorohydride, sulfate, alkylsulfate, carboxylate, sulfonate or the like of ammonium such as tetraethyl ammonium, tetrabutyl ammonium, lauryl trimethyl ammonium, dodecyl trimethyl ammonium, hexadecyl trimethyl ammonium, stearyl trimethyl ammonium, octadecyl trimethyl ammonium, benzyl trimethyl ammonium, modified aliphatic dimethylethyl ammonium or the like; an inorganic ion conducting agent such as perchlorate, chlorate, hydrochloride, bromate, iodate, borofluorohydride, trifluoromethyl sulfate, sulfonate or the like of an alkali metal or alkaline earth metal such as lithium, sodium, calcium, magnesium or the like.

As the electrically conducting agent may be used a mixture of two or more kinds. In this case, the conductive property can be stably developed even to the variation of a voltage applied or a change of environment. As an example of the mixture may be mentioned a mixture of the carbon-based conducting agent and the electron conducting agent other than the carbon-based or the ion conducting agent.

When the ultraviolet curing type resin is used as a resin constituting the elastic layer 3, a ultraviolet initiator for promoting the start of the curing reaction of the resin in the formation step is included in the ultraviolet curing type resin.

When the carbon-based conducting agent is used as an electrically conducting agent controlling the conductive property of the elastic layer 3, there is a possibility that ultraviolet ray irradiating for the curing may not arrive at the interior of the layer due to the obstruction with this conducting agent. In this case, the ultraviolet initiator can not sufficiently develop its function, which results in that the curing reaction does not proceed sufficiently.

In order to improve this point, it is preferable to use a substance having a maximum wavelength of a ultraviolet absorption wavelength zone of not less than 400 nm as a ultraviolet initiator for absorbing a long wavelength ultraviolet capable of entering into the interior of the layer. As such a ultraviolet initiator may be used α-aminoacetophenone, acylphosphine oxide, thioxthantonoamine and the like. As a more concrete example thereof may be mentioned bis(2,4,6-trimethylbenzoyl)-phenylphosphine oxide or 2-methyl-1-[4-(methylthio)phenyl]-2-morpholinopropane-1-on.

As the ultraviolet initiator, it is preferable to include a short wavelength substance having a maximum wavelength of a ultraviolet absorption wavelength zone of less than 400 nm in addition to the long wavelength substance having the maximum wavelength of ultraviolet absorption wavelength zone of not less than 400 nm. Thus, in case of using the carbon-based conducting agent, the curing reaction can be well promoted not only in the interior of the layer but also in the vicinity of the surface of the layer.

As the ultraviolet initiator having such a short wavelength absorption zone may be mentioned 2,2-dimethoxy-1,2-diphenylethane-1-on, 1-hydroxy-cyclohexyl-phenylketone, 2-hydroxy-2-methyl-1-phenylpropane-1-on, 1-[4-(2-hydroxyethoxy)phenyl] 2-hydroxy-2-methyl-1-propane-1-on, 2-methyl-1-[4-phenyl]-2-morpholinopropane-1-on and the like.

Moreover, in case of using the electrically conducting agent other than the carbon-based conducting agent, the ultraviolet initiator can be selected independently of the maximum wavelength of ultraviolet absorption wavelength zone. For example, it may be properly selected from the aforementioned ones.

In case of compounding the ultraviolet initiator, the compounding amount is preferable to be 0.1-10 parts by weight per 100 parts by weight of the (metha)acrylate oligomer.

In the invention, the ultraviolet curing type resin may be added with a tertiary amine such as triethylamine, triethanolamine or the like, an alkylphosphine-based photopolymerization accelerator such as triphenyl phosphine or the like, a thioether-based photopolymerization accelerator such as p-thiodiglycol or the like and so on for promoting the polymerization reaction through the aforementioned initiator, if necessary, in addition to the above components. In case of adding these compounds, the addition amount is preferable to be usually within a range of 0.01-10 parts by weight per 100 parts by weight of the (metha)acrylate oligomer.

The above ultraviolet curing type resin or electron beam curing type resin may contain a reactive diluent, if necessary, in addition to the electrically conducting agent.

The invention is premised on that the elastic layer 3 has a glass transition point of not higher than −40° C., but the glass transition point is more preferably −70° C. to −50° C. When the electrical conductive roller 1 is particularly used as a developing roller, if the glass transition point is higher than −40° C., the function inherent to the elastic layer of mitigating stress applied to the electrical conductive roller or toners can not be developed, and the contact area between the electrical conductive roller and the latent image support becomes small, and there is fear that the good development can not be conducted. Further, the toners are damaged and the fixation of toners to a photosensitive body or a stratification blade and the like are caused, which is apt to easily deteriorate the image. Inversely, when the glass transition point of the elastic layer 3 is too low, the hardness becomes too low and the friction force to the photosensitive body or stratification blade becomes large, and there is a fear that the poor imaging such as jitter or the like is caused.

Since the elastic layer 3 is used in contact with the photosensitive body, stratification blade or the like, even if the hardness is set to a low level, it is preferable that the compression permanent strain is made as small as possible. Concretely, it is preferable to be not more than 20%.

In order to control the hardness of the elastic layer made from the above ultraviolet curing type resin or electron beam curing type resin, it is preferable to change the crosslinking density of these resins. By lowering the crosslinking density can be obtained an elastic layer having a lower hardness.

As mentioned above, the elastic layer 3 is constituted with the ultraviolet curing type resin or the electron beam curing type resin, which is a construction designed for the purpose that the elastic layer 3 is formed by applying a paint without using the mold and hence the drying step is eliminated to reduce the equipment cost. For this end, it is required that a non-solvent or low solvent paint can be used and cured only by irradiating ultraviolet ray or electron beam. In this case, therefore, the paint is necessarily high in the viscosity.

As the method of forming the elastic layer 3, it is required to use a method wherein such a high viscosity paint can be applied in a higher precision. As a preferable method may be mentioned a die coat method, a roll coat method and a ring coater method. In the method of forming the elastic layer 3 by spraying, which has been usually used as the application method, it is difficult to spray the high viscosity paint, while in case of a dip coat method wherein the shaft member is immersed in the paint placed in a dip tank, the layer thickness becomes too thick because the viscosity is too high, so that it is difficult to use such two later methods.

Figure 14:
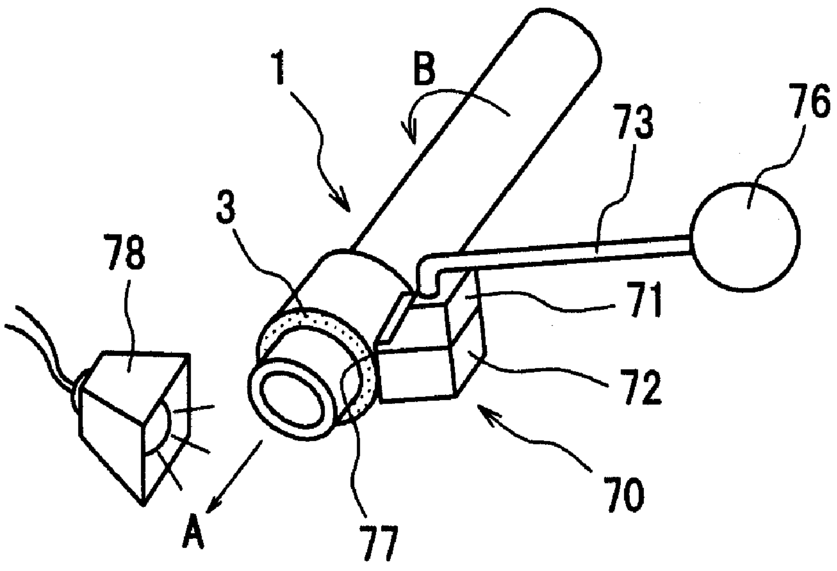
FIG. 14 is a perspective view of a forming conductive layer in the formation of a layer through a die coating method.

FIG. 14 is a perspective view of a forming electrical conductive roller 1 when the elastic layer 3 is formed by a die coating method. A die coater 70 is constructed with divided upper die head 71 and lower die head 72, in which a feed path of the paint forming the elastic layer 3 is formed therebetween and a top of the path is provided with an opening portion 77 opened in the form of a slit. The die coater 70 is fixed at a posture of directing the opening portion 77 to an axial direction of the shaft member 2. In the thus arranged die coater 70, the paint is supplied from a constant-volume pump 76 through a feed pipe 73 to the feed path between the upper and lower die heads 71, 72 and then injected from the opening portion 77 onto the peripheral face of the shaft member 2.

Also, the die coater 70 is provided with a ultraviolet ray irradiation means or an electron beam irradiation means 78.

In the formation of the elastic layer 3, both ends of the shaft member 2 in the electrical conductive roller 1 are born by a way not shown at a state of fixing the die coater 70 at a predetermined position, while the whole of the shaft member 2 is displaced in the axial direction (arrow A) while rotating one of both the ends at a predetermined rotating speed by a driving means such as motor or the like (arrow B), whereby the above paint is spirally applied to form a coating film over a full peripheral face of the shaft member 2 and the coating film is continuously cured by an irradiation means 78 just after the application. Thus, the elastic layer 3 can be formed simply with a space-saving apparatus by the die coat method.

The shaft member 2 and the die coater 70 are sufficient to be relatively moved in the axial direction. In the illustrated embodiment, the shaft member 2 is displaced in the axial direction. Instead of this, or in addition to this, the die coater 70 may be displaced in the axial direction. Thus, the shaft member 2 and the die coater 70 may be relatively moved in the axial direction.

Figure 15:
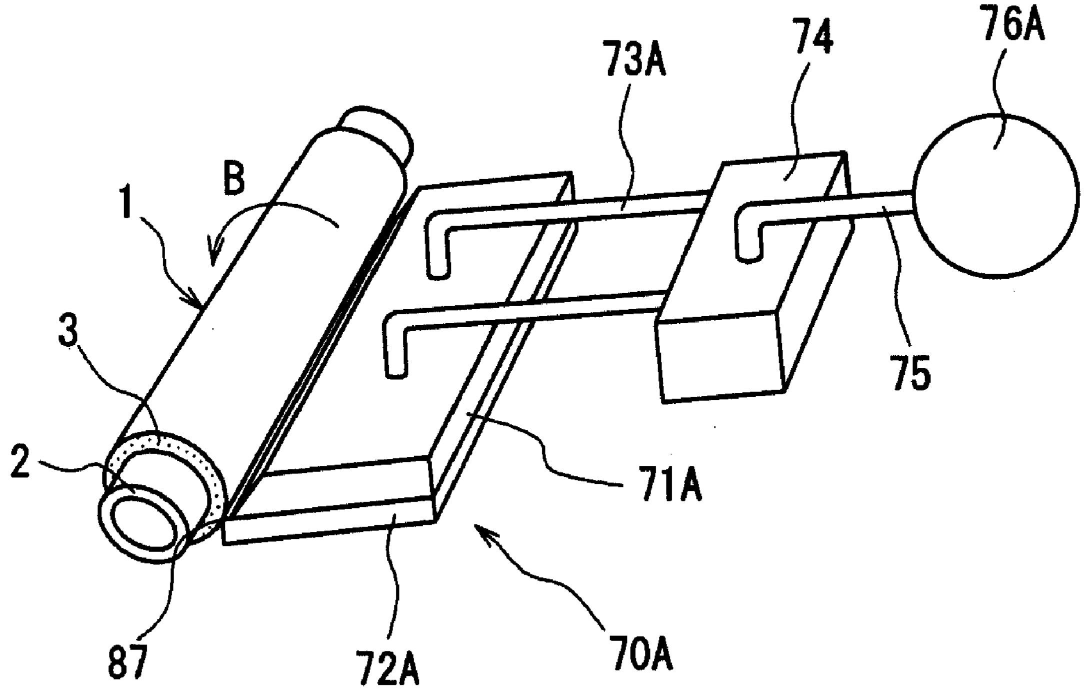
FIG. 15 is a perspective view of another embodiment through a die coating method.

In the method shown in FIG. 14, the opening portion 77 in the die coater 70 is shorter than the length of the elastic layer 3, and the shaft member is relatively displaced to the die coater 70 in the axial direction, whereby the paint is applied over the full length of the shaft member 2. Instead of this method, as shown by a perspective view in FIG. 15, a die coater 70A having an opening length equal to the length of the elastic layer 3 is used and rotated only one times without relatively moving the shaft member 2 to the die coater 70 in the axial direction, whereby the elastic layer 3 can be also formed.

In this case, the die coater 70A is constructed with divided upper die head 71A and lower die head 72A, in which a feed path of the paint forming the elastic layer 3 is formed therebetween and a top of the path is provided with a slit-shaped opening portion 77A having a length equal to the elastic layer 3. The die coater 70A is fixed at a posture of directing the opening portion 87 to the axial direction of the shaft member 2, and the paint is supplied from a constant-volume pump 76A through a feed pipe 75, a manifold 74 and a feed pipe 73A in this order to the feed path between the upper and lower die heads 71A, 72A and then injected from the opening portion 77A onto the peripheral face of the shaft member 2.

When the coating film formed on the peripheral face of the shaft member 2 using the die coater 70A is cured, an irradiation means of irradiating ultraviolet ray or electron beam not shown can be synchronized with the rotation of the shaft member while rotating the shaft member 2.

Figure 16:
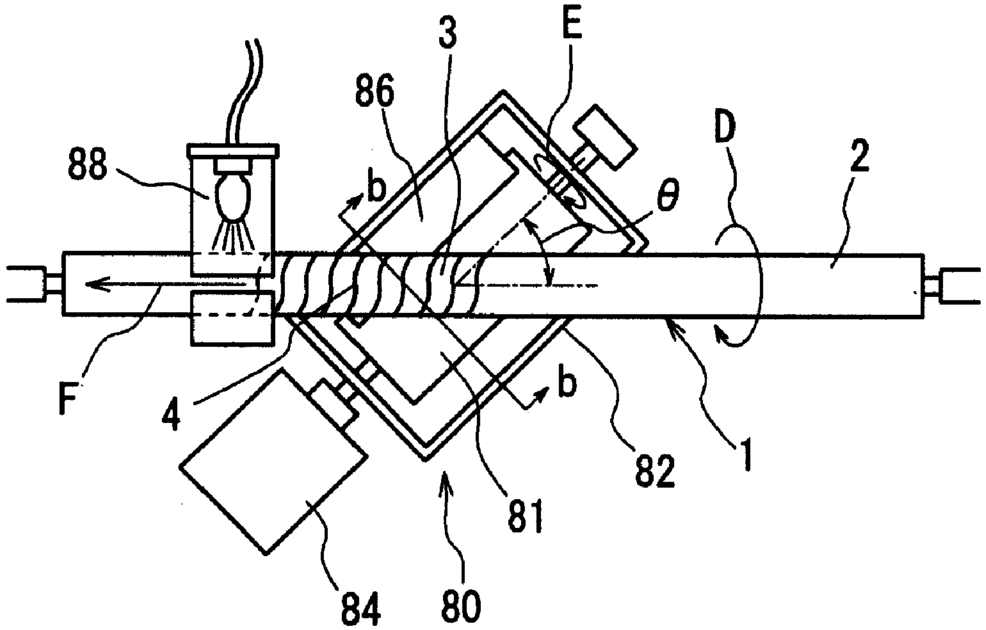
FIG. 16 is a plan view and a section view illustrating a forming conductive roller in the formation of a layer through a roll coating method.
Figure 16:
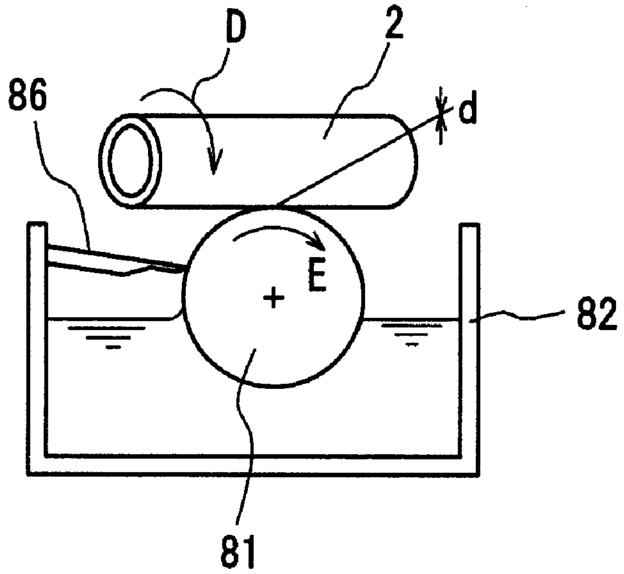

FIG. 16(*a*) is a perspective view of a forming electrical conductive roller 1 when the elastic layer 3 is formed by a roll coat method, and FIG. 16(*b*) is a section view corresponding to b-b arrow in FIG. 16(*a*). A roller coater 80 comprises a coating roll 81 immersed in the paint stored in a paint tank 82 and a roll driving motor 84 rotating the coating roll 81 (direction E), while the shaft member 2 in the electrical conductive roller 1 is born at both ends by a means not shown and is constructed so as to displace the whole of the shaft member 2 in the axial direction (arrow F) while one of both the ends is rotated by a driving motor or the like at a predetermined rotating speed (arrow D). Further, the ultraviolet ray irradiation means or electron beam irradiation means 88 is arranged in parallel to the roll coater 80.

The surface of the coating roll 81 is closed to the peripheral face of the shaft member 2 in the electrical conductive roller 1 through a predetermined gap d, and the paint drawn by the peripheral face of the coating roll 81 is transferred onto the peripheral face of the shaft member 2, whereby the elastic layer 3 can be formed on the peripheral face of the shaft member 2. At this moment, the axial line of the coating roller 81 is arranged so as to incline at an angle θ with respect to the axial line of the shaft member 2, and the shaft member 2 is rotated and displaced in the axial direction, whereby the paint is spirally applied to form a coating film over the full peripheral face of the shaft member 2, while the coating film can be cured continuously by the irradiation means 78 just after the formation. In this case, the equipment for forming the elastic layer 3 can also be made simple, space-saving and cheap.

By inclining the axial line of the coating roll 81 at the angle θ with respect to the axial line of the shaft member 2 can be prevented the occurrence of departure line formed when the roll and the member are arranged in parallel and separated away from each other. Also, a doctor blade 86 regulating the amount of the paint drawn by the coating roll 81 is arranged in the roll coater 80, whereby the thickness of the elastic layer 3 formed on the shaft member 2 can be controlled in a higher precision. Further, gravure-like unevenness is formed in the peripheral face of the coating roll 81, whereby the amount of the paint drawn can be ensured and also the amount of the paint applied onto the shaft member 2 can be controlled in a high precision.

The formation of the surface layer 4 having a glass transition point of higher than −40° C. on the outside of the thus formed elastic layer 3 will be described below.

Although the surface layer 4 may be made from various resins, it is preferable to be made from a ultraviolet curing type resin containing an electrically conducting agent and a ultraviolet initiator or an electron beam curing type resin containing an electrically conducting agent in a point that the equipment cost can be reduced. Also, the surface layer 4 is preferable to be formed by applying a paint made from the above resin onto the peripheral face of the shaft member 2 provided with the elastic layer 3, whereby the mold and drying device for the formation of the surface layer 4 can be eliminated.

Further, it is preferable that the irradiation means used for the curing in the elastic layer 3 can be also utilized for curing the resin for the surface layer 4 in view of the equipment cost. That is, it is preferable that when the resin constituting the elastic layer 3 is the ultraviolet curing type resin, the resin used for the surface layer 4 is also a ultraviolet curing type resin, while when the resin constituting the elastic layer 3 is the electron beam curing type resin, the resin used for the surface layer 4 is also an electron beam curing type resin.

When the surface layer 4 is made from the ultraviolet curing type resin containing an electrically conducting agent and a ultraviolet initiator or the electron beam curing type resin containing an electrically conducting agent, the embodiments of the resin, electrically conducting agent and ultraviolet initiator used may be the same as described on the elastic layer 3.

Also, the surface layer 4 having the above construction can be formed by the same method as described on the formation of the elastic layer 3, i.e. by using the die coat method or roll coat method. In this case, the expression “applying the paint onto the peripheral face of the shaft member 2” and the like in the previous description on the elastic layer 3 may be replaced with the expression “applying the paint onto the peripheral face of the elastic layer 3 formed on the shaft member 2”.

At this moment, if it is intended to obtain desirable surface properties of the developing roller such as securement of transferring force of toners supported on the outer peripheral face to the latent image support and the like, fine particles can be dispersed into any of the layers to form an irregularity on the peripheral face of the electrical conductive roller 1. However, when the fine particles are dispersed into an outermost layer, there is a possibility that the fine particles are worn or the properties thereof are changed due to the direct contact of the fine particles with the photosensitive drum or the like. Therefore, the fine particles are preferable to be included in an inside layer adjacent to the outermost layer. In the electrical conductive roller 1 having the one surface layer 4, it is preferable to include the fine particles in the outermost elastic layer 3.

Moreover, when the total thickness of the elastic layer is large, it is preferable that the elastic layer is divided into plural layers and the fine particles are included in only an outermost layer, whereby the bad influence of the fine particle dispersion on the properties inherent to the elastic layer can be suppressed.

As the fine particles are preferable fine particles of rubber or synthetic resin and carbon fine particles. Concretely, one or more kinds of fine particles selected from silicone rubber, acrylic resin, styrene resin, acryl/styrene copolymer, fluorine resin, urethane elastomer, urethane acrylate, melamine resin, epoxy resin, phenolic resin and silica are preferable.

The addition amount of the fine particles is preferable to be 0.1-100 parts by weight, particularly 5-80 parts by weight per 100 parts by weight of the resin.

The fine particles are preferable to have an average particle size a of 1-50 μm, particularly 3-20 μm. Also, the thickness b of the layer dispersing the fine particles therein is preferably 1-50 μm.

EXAMPLES

In Table 1 are organized components (parts by mass), formation method, curing method, curing time, glass transition point and thickness with respect to each layer in an electrical conductive roller and results of evaluating images by a printer assembled with such a roller.

The formation method of respective electrical conductive rollers to be prepared will be described below.

Example 1

After an elastic layer shown in Table 1 is formed on a shaft member made of a metal pipe by a die coat method, ultraviolet ray having an accumulated light quantity of 5000 $mj/cm^2$ is irradiated in a nitrogen atmosphere. Then, a surface layer shown in Table 1 is formed by a roll coat method and thereafter ultraviolet ray having an accumulated light quantity of 5000 $mj/cm^2$ is irradiated in a nitrogen atmosphere to obtain an electrical conductive roller of 16 mmϕ provided on the metal pipe with the elastic layer and the surface layer. The resulting roller is incorporated into a cartridge as a developing roller to conduct the evaluation of images.

Example 2

After an elastic layer shown in Table 1 is formed on a shaft member of a hollow cylindrical body made of an electrically conductive by a die coat method, ultraviolet ray having an accumulated light quantity of 5000 $mj/cm^2$ is irradiated in a nitrogen atmosphere. In the formation of the elastic layer, the coating is carried out to render a thickness of an outermost layer into 10 μm, whereby an irregularity of particles is given to the surface of the elastic layer. Then, a surface layer shown in Table 1 is formed by a roll coat method and thereafter ultraviolet ray having an accumulated light quantity of 5000 $mj/cm^2$ is irradiated in a nitrogen atmosphere to obtain an electrical conductive roller of 16 mmϕ provided with the elastic layer and the surface layer. The resulting roller is incorporated into a cartridge as a developing roller to conduct the evaluation of images.

Example 3

After an elastic layer shown in Table 1 is formed on a shaft member made of a metal pipe by a die coat method, electron beams of 200 kGy are irradiated in a nitrogen atmosphere. In the formation of the elastic layer, the coating is carried out to render a thickness of an outermost layer into 10 μm, whereby an irregularity of particles is given to the surface of the elastic layer. Then, a surface layer shown in Table 1 is formed by a roll coat method and thereafter electron beams of 200 kGy are irradiated in a nitrogen atmosphere to obtain an electrical conductive roller of 16 mmϕ provided with the elastic layer and the surface layer. The resulting roller is incorporated into a cartridge as a developing roller to conduct the evaluation of images. The elastic layer, surface layer, formation conditions, material properties and image evaluation result are shown in Table 1.

Examples 4-9

After an elastic layer shown in Table 1 is formed on a shaft member of a hollow cylindrical body made of an electrically conductive by a die coat method, ultraviolet ray having an accumulated light quantity of 5000 mj/cm$^2$ is irradiated in a nitrogen atmosphere. Then, a surface layer shown in Table 1 is formed by a roll coat method and thereafter ultraviolet ray having an accumulated light quantity of 5000 mj/cm$^2$ is irradiated in a nitrogen atmosphere to obtain an electrical conductive roller of 16 mmϕ provided with the elastic layer and the surface layer. The resulting roller is incorporated into a cartridge as a developing roller to conduct the evaluation of images. The elastic layer, surface layer, formation conditions, material properties and image evaluation result are shown in Table 1.

Comparative Example 1

Onto a shaft member of a hollow cylindrical body made of an electrically conductive resin are formed and evaluated an elastic layer and a surface layer shown in Table 1 in the same manner as Example 2.

Comparative Example 2

To 100 parts by weight of polyether polyol being three functions obtained by adding propylene oxide to glycerin and having a molecular weight of 9000 are added 1.6 parts of conductive carbon and 0.15 part of dibutyltin dilaurate, which is sufficiently mixed and stirred and deaerated for 20 minutes with stirring under a reduced pressure to form a polyol component. The polyol component has a hydroxyl value of 19 mgKOH/g. On the other hand, polypropylene glycol-modified polymeric MDI having a NCO content of 11% as an isocyanate component is deaerated for 20 minutes with stirring under a reduced pressure to form an isocyanate component. The polyol and isocyanate are mixed in a two-component casting machine with stirring at a high speed of 3000 rpm so that a ratio of polyol component to isocyanate component is 101.75/13.70 (isocyanate index: 103) and the resulting urethane stock solution is poured into a cylindrical mold set with a core having an outer diameter of 8 mmϕ and then cured in a hot air circulating oven at 90° C. for 60 minutes. A urethane roller provided with the core is taken out from the cylindrical mold to obtain a roller body.

A surface layer shown in Table 1 is formed on an outer peripheral face of the roller body by a dip coat method and thereafter cured by heating at 100° C. for 120 minutes to obtain an electrical conductive roller of 16 mmϕ provided with the elastic layer and the surface layer. The resulting roller is incorporated into a cartridge as a developing roller to conduct the evaluation of images. The elastic layer, surface layer, formation conditions, material properties and image evaluation result are shown in Table 1.

A surface layer shown in Table 1 is formed on an outer peripheral face of the roller body by a dip coat method and thereafter cured by heating at 100° C. for 120 minutes to obtain an electrical conductive roller of 16 mmϕ provided with the elastic layer and the surface layer. The resulting roller is incorporated into a cartridge as a developing roller to conduct the evaluation of images.

As to the term of "Formation method" in Table 1, "die coat" means the coating by the die coat method, and "roll coat" means the coating by the roll coat method, and "dip coat" means the coating by the dip coat method, respectively.

As to the term "Curing method" in Table 1, "UV" means ultraviolet curing, and "EB" means electron beam curing, and "Heat" means thermosetting, respectively.

The measurement of glass transition point is carried out by using a differential scanning calorimeter (Model: 2920M-DSC (made by D.A. Instrument)), and the measuring conditions are a temperature rising rate of not more than 10° C./min and a sample amount of 8 mg.

In the evaluation of images, the image is evaluated by using a printer Color Laser Jet 4600 made by Hewlett-Packard Co. and a cartridge for "Black" is used as a cartridge mounting a developing roller. Also, each item in the image evaluation is carried out by visually judging the printed paper.

TABLE 1

| | | | | Example 1 | Example 2 | Example 3 | Example 4 | Example 5 | Example 6 |
|---|---|---|---|---|---|---|---|---|---|
| Shaft member | | | | metal pipe | hollow cylindrical body of conductive resin | metal pipe | hollow cylindrical body of conductive resin | hollow cylindrical body of conductive resin | hollow cylindrical body of conductive resin |
| Elastic layer | oligomer | urethane-based acrylate/UV3700B (made by Nippon Synthetic Chemical Industry Co., Ltd.) | parts by mass | 60 | | | | | |
| | | urethane-based acrylate/UA340P (made by Shin-Nakamura Kagaku Co., Ltd.) | | | 60 | | | | |
| | | urethane-based acrylate/UA334Pz (made by Shin-Nakamura Kagaku Co., Ltd.) | | | | | | 60 | 60 |
| | | urethane-based acrylate/UV3000B (made by Nippon Synthetic Chemical Industry Co., Ltd.) | | | | 60 | | | |
| | | urethane-based acrylate/UA240PX (made by Shin-Nakamura Kagaku Co., Ltd.) | | | | | 60 | | |
| | | urethane-based acrylate/U-108A (made by Shin-Nakamura Kagaku Co., Ltd.) | | | | | | | |
| | monomer | urethane-based acrylate/ASA (made by Shin-Nakamura Kagaku Co., Ltd.) | | | | | | 10 | 10 |
| | | urethane-based acrylate/MTG-A (made by Kyouei-Sha Kagaku Co., Ltd.) | | 40 | 40 | 40 | 40 | 30 | 30 |
| | urethane | electrically conductive urethane | | | | | | | |
| | electrically conducting | ion-based/MP100 (made by Akishima Kagaku Co., Ltd.) | | 1 | 1 | | 1 | 1 | 1 |
| | agent | Ketjenblack EC (made by Lion Corp.) | | | | 3 | | | |
| | particles photoinitiator | CFB-101-40 (made by Dainippon Ink and Chemicals, Inc.) | | | 10 | 10 | | | |

TABLE 1-continued

| | | | | | | | | |
|---|---|---|---|---|---|---|---|---|
| | | IRGACURE 184 (made by Ciba Geigy Co., Ltd.) | 1 | 1 | | 1 | 1 | 1 |
| Surface layer | oligomer | urethane-based acrylate/UF8001 (made by Kyouei-Sha Kagaku Co., Ltd.) | 60 | | | 60 | 60 | 60 |
| | | urethane-based acrylate/UV7000B (made by Nippon Synthetic Chemical Industry Co., Ltd.) | | 60 | 60 | | | |
| | | urethane-based acrylate/UA240PX (made by Shin-Nakamura Kagaku Co., Ltd.) | | | | | | |
| | monomer | methoxytrieyhylene glycol acrylate/MTG-A (made by Kyouei-Sha Kagaku Co., Ltd.) | 40 | 40 | 40 | 40 | | |
| | | phenoxyethyl acrylate/POA (made by Kyouei-Sha Kagaku Co., Ltd.) | | | | | 40 | |
| | | 2-butyl-2-ethyl-1,3-propane diol diacrylate/BEPGA (made by Kyouei-Sha Kagaku Co., Ltd.) | | | | | | |
| | | 1,6-hexane diol diacrylate/1,6HXA (made by Kyouei-Sha Kagaku Co., Ltd.) | | | | | | 40 |
| | resin | solvent-based polyester urethane/UR3200 (made by Toyobo Co., Ltd.) | | | | | | |
| | electrically conducting agent | Ketjenblack EC (made by Lion Corp.) | 1.5 | 1.5 | 1.5 | 1.5 | 1.5 | 1.5 |
| | particles | CFB-101-40 (made by Dainippon Ink and Chemicals, Inc.) | 10 | | | 10 | 10 | 20 |
| | | CFB-100 (made by Dainippon Ink and Chemicals, Inc.) | | | | | | |
| | | ARX806 (made by Sekisui Chemical Co., Ltd.) | | | | | | |
| | photoinitiator | DETX-S (made by Nippon Kayaku Co., Ltd.) | 2 | 2 | | 2 | 2 | 2 |
| | | DMBI (made by Nippon Kayaku Co., Ltd.) | 1 | 1 | | 1 | 1 | 1 |

| | | Example 1 | Example 2 | Example 3 | Example 4 | Example 5 | Example 6 |
|---|---|---|---|---|---|---|---|
| Formation method | elastic layer | die coat | die coat | die coat | die coat | die coat | die coat |
| | surface layer | roll coat | roll coat | die coat | roll coat | roll coat | roll coat |
| | high precision mold | useless | useless | useless | useless | useless | useless |
| Curing method | elastic layer | UV | UV | EB | UV | UV | UV |
| | surface layer | UV | UV | EB | UV | UV | UV |
| Curing time | curing time for elastic layer (min/layer) | 0.2 | 0.2 | 0.1 | 0.2 | 0.2 | 0.2 |
| | curing time for surface layer (min/layer) | 0.2 | 0.2 | 0.1 | 0.2 | 0.2 | 0.2 |
| Glass transition point | glass transition point of elastic layer (° C.) | −64 | −62 | −54 | −42 | −60 | −60 |
| | glass transition point of surface layer (° C.) | −34 | −19 | −19 | −34 | 0 | 45 |
| Thickness | thickness of elastic layer (μm) | 1000 | 800 | 800 | 1100 | 1100 | 1100 |
| | thickness of surface layer (μm) | 8 | 9 | 12 | 8 | 8 | 10 |
| Initial image | concentration of black image | ○ | ○ | ○ | ○ | ○ | ○ |
| | halftone unevenness | ○ | ○ | ○ | ○ | ○ | ○ |
| | toner filming | ○ | ○ | ○ | ○ | ◎ | ◎ |
| Image after continuous | concentration of black image | Δ | ○ | ○ | Δ | ○ | ○ |
| | halftone | ○ | ○ | ○ | ○ | ○ | ○ |

TABLE 1-continued

| | | | | | | |
|---|---|---|---|---|---|---|
| printing of 5000 papers | unevenness toner ilming | ○ | ○ | ○ | ○ | ◎ | ◎ |

| | | | | Example 7 | Example 8 | Example 9 | Comparative Example 1 | Comparative Example 2 |
|---|---|---|---|---|---|---|---|---|
| Shaft member | | | | hollow cylindrical body of conductive resin | hollow cylindrical body of conductive resin | hollow cylindrical body of conductive resin | hollow cylindrical body of conductive resin | solid metal |
| Elastic layer | oligomer | urethane-based acrylate/UV3700B (made by Nippon Synthetic Chemical Industry Co., Ltd.) | parts by mass | | | | | |
| | | urethane-based acrylate/UA340P (made by Shin-Nakamura Kagaku Co., Ltd.) | | | | | | |
| | | urethane-based acrylate/UA334Pz (made by Shin-Nakamura Kagaku Co., Ltd.) | | | | | | |
| | | urethane-based acrylate/UV3000B (made by Nippon Synthetic Chemical Industry Co., Ltd.) | | 60 | 60 | 60 | | |
| | | urethane-based acrylate/UA240PX (made by Shin-Nakamura Kagaku Co., Ltd.) | | | | | | |
| | | urethane-based acrylate/U-108A (made by Shin-Nakamura Kagaku Co., Ltd.) | | | | | 60 | |
| | monomer | urethane-based acrylate/ASA (made by Shin-Nakamura Kagaku Co., Ltd.) | | 10 | 10 | 10 | | |
| | | urethane-based acrylate/MTG-A (made by Kyouei-Sha Kagaku Co., Ltd.) | | 30 | 30 | 30 | 40 | |
| | urethane | electrically conductive urethane | | | | | | 100 |
| | electrically conducting agent | ion-based/MP100 (made by Akishima Kagaku Co., Ltd.) | | 1 | 1 | 1 | 1 | |
| | | Ketjenblack EC (made by Lion Corp.) | | | | | | |
| | particles | CFB-101-40 (made by Dainippon Ink and Chemicals, Inc.) | | | | | 10 | |
| | photoinitiator | IRGACURE 184 (made by Ciba Geigy Co., Ltd.) | | 1 | 1 | 1 | 1 | |
| Surface layer | oligomer | urethane-based acrylate/UF8001 (made by Kyouei-Sha Kagaku Co., Ltd.) | | 60 | 60 | 60 | 60 | |
| | | urethane-based acrylate/UV7000B (made by Nippon Synthetic Chemical Industry Co., Ltd.) | | | | | | |
| | | urethane-based acrylate/UA240PX (made by Shin-Nakamura Kagaku Co., Ltd.) | | | | | | |
| | monomer | methoxytrieyhylene glycol acrylate/MTG-A (made by Kyouei-Sha Kagaku Co., Ltd.) | | | | | 40 | |
| | | phenoxyethyl acrylate/POA (made by Kyouei-Sha Kagaku Co., Ltd) | | | 40 | 40 | | |
| | | 2-butyl-2-ethyl-1,3-propane diol diacrylate/BEPGA (made by Kyouei-Sha Kagaku Co., Ltd.) | | 40 | | | | |
| | | 1,6-hexane diol diacrylate/1,6HXA (made by Kyouei-Sha Kagaku Co., Ltd.) | | | | | | |
| | resin | solvent-based polyester urethane/UR3200 (made by Toyobo Co., Ltd.) | | | | | | 100 |
| | electrically conducting agent | Ketjenblack EC (made by Lion Corp.) | | 1.5 | 1.5 | 1.5 | 1.5 | 1.5 |
| | particles | CFB-101-40 (made by Dainippon Ink and Chemicals, Inc.) | | 15 | | | | 10 |
| | | CFB-100 (made by Dainippon Ink and Chemicals, Inc.) | | | 10 | | | |
| | | ARX806 (made by Sekisui Chemical Co., Ltd.) | | | | 10 | | |
| | photoinitiator | DETX-S (made by Nippon Kayaku Co., Ltd.) | | 2 | 2 | 2 | 2 | |
| | | DMBI (made by Nippon Kayaku Co., Ltd.) | | 1 | 1 | | 1 | 1 |

| | | Example 7 | Example 8 | Example 9 | Comparative Example 1 | Comparative Example 2 |
|---|---|---|---|---|---|---|
| Formation method | elastic layer | die coat | die coat | die coat | die coat | mold |
| | surface layer | roll coat | roll coat | die coat | roll coat | dip coat |
| | high precision mold | useless | useless | useless | useless | use |

TABLE 1-continued

| | | | | | | |
|---|---|---|---|---|---|---|
| Curing method | elastic layer | UV | UV | UV | UV | heat |
| | surface layer | UV | UV | UV | UV | heat |
| Curing time | curing time for elastic layer (min/layer) | 0.2 | 0.2 | 0.2 | 0.2 | 60 |
| | curing time for surface layer (min/layer) | 0.2 | 0.2 | 0.2 | 0.2 | 120 |
| Glass transition point | glass transition point of elastic layer (° C.) | −60 | −60 | −60 | −36 | −65 |
| | glass transition point of surface layer (° C.) | 46 | 0 | 0 | −34 | −3 |
| Thickness | thickness of elastic layer (μm) | 1100 | 1100 | 1100 | 1100 | 3000 |
| | thickness of surface layer (μm) | 10 | 18 | 7 | 7 | 7 |
| Initial image | concentration of black image | ○ | ○ | ○ | X | ○ |
| | halftone unevenness | ○ | ○ | ○ | X | ○ |
| | toner filming | ◎ | ◎ | ◎ | ○ | ○ |
| Image after continuous printing of 5000 papers | concentration of black image | ○ | ○ | ○ | X | Δ |
| | halftone unevenness | ○ | ○ | ○ | X | ○ |
| | toner ilming | ◎ | ◎ | ◎ | ○ | ○ |

Industrial Applicability

The electrical conductive roller according to the invention is preferably used as a charge roller, an electrical conductive roller, a transfer roller, a conductive roller, a middle transfer roller, a toner feed roller, a cleaning roller, a belt driving roller, a paper feed roller or the like by mounting in an imaging apparatus such as a plain paper copier, a plain paper facsimile, a laser beam printer, a color laser beam printer, a toner jet printer or the like.

The invention claimed is:

1. An electrical conductive roller comprising a shaft member born at both end portions in a lengthwise direction thereof, and one or more elastic layers arranged on a radially outside thereof and having a glass transition point of not higher than −40° C., wherein at least one of the elastic layers is constituted with an ultraviolet curing type resin containing an electrically conducting agent and an ultraviolet initiator, wherein one or more surface layers having a glass transition point of higher than −40° C. are arranged outside of an outermost elastic layer and such a surface layer is constituted with an ultraviolet curing resin containing an electrically conducting agent and an ultraviolet initiator.

2. An electrical conductive roller according to claim 1, wherein the roller is used as a developing roller for feeding a non-magnetic developing agent supported on an outer peripheral face thereof to a latent image support, and an outermost layer of the elastic layers is constituted with a resin dispersed with fine particles.

3. An electrical conductive roller according to claim 2, wherein the fine particles have an average particle size of 1-50 μm.

4. An electrical conductive roller according to claim 2, wherein a content of the fine particles in the outermost elastic layer is 0.1-100 parts by weight based on 100 parts by weight of the resin.

5. An electrical conductive roller according to claim 1, wherein the electrically conducting agent is a carbon-based conducting agent, an ion conducting agent or a metal oxide, and when the carbon-based conducting agent is included as the electrically conducting agent, a substance having a maximum wavelength of an ultraviolet absorption wavelength zone of not less than 400 nm is included in the ultraviolet initiator.

6. An electrical conductive roller according to claim 1, wherein a crosslinking density of the ultraviolet curing resin or electron beam curing resin in the elastic layer is made smaller than that of the surface layer.

7. An electrical conductive roller according to claim 1, wherein the shaft member is constituted with a metal pipe or a hollow cylindrical body or a solid cylinder made from a resin containing an electrically conducting agent.

* * * * *